US012154486B2

(12) United States Patent
Lim et al.

(10) Patent No.: US 12,154,486 B2
(45) Date of Patent: Nov. 26, 2024

(54) DISPLAY PANEL, DISPLAY DRIVER AND DISPLAY DEVICE

(71) Applicant: Samsung Display Co., LTD., Yongin-si (KR)

(72) Inventors: Jaekeun Lim, Yongin-si (KR); Jin-Wook Yang, Yongin-si (KR); Bon-Seog Gu, Yongin-si (KR); Jinyoung Roh, Yongin-si (KR); Hae-Kwan Seo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/136,430

(22) Filed: Apr. 19, 2023

(65) Prior Publication Data

US 2024/0062704 A1 Feb. 22, 2024

(30) Foreign Application Priority Data

Aug. 19, 2022 (KR) ........................ 10-2022-0103822

(51) Int. Cl.
*G09G 3/32* (2016.01)

(52) U.S. Cl.
CPC ....... *G09G 3/32* (2013.01); *G09G 2300/0452* (2013.01); *G09G 2310/0272* (2013.01); *G09G 2310/0297* (2013.01); *G09G 2320/0233* (2013.01); *G09G 2330/021* (2013.01)

(58) Field of Classification Search
CPC ............. G09G 3/32; G09G 2300/0452; G09G 2310/0272; G09G 2310/0297; G09G 2320/0233; G09G 2330/021; G09G 3/2003; G09G 2300/0426; G09G 2300/0819; G09G 2300/0842; G09G 2300/0861; G09G 3/3233; G09G 3/20; G09G 2300/0439; G09G 2310/0202; G09G 2310/0243; G09G 2310/0264; G09G 2320/0626
See application file for complete search history.

(56) References Cited

U.S. PATENT DOCUMENTS

2017/0270868 A1* 9/2017 Li ........................ G09G 3/2003
2018/0151145 A1* 5/2018 Lee .......................... G09G 5/02
2021/0233455 A1* 7/2021 Yang .................... G09G 3/3291

FOREIGN PATENT DOCUMENTS

KR 1020190062679 A 6/2019

* cited by examiner

*Primary Examiner* — Grant Sitta
(74) *Attorney, Agent, or Firm* — CANTOR COLBURN LLP

(57) ABSTRACT

A display panel of a display device includes: first light emitting elements located in a first row, second light emitting elements located in a second row adjacent to the first row, first pixel circuits located in the first row, and second pixel circuits located in the second row. Each of the first pixel circuits drives a first light emitting element, located in a column the same as a column in which the each of the first pixel circuits is located, among the first light emitting elements. At least one second pixel circuit of the second pixel circuits drives a second light emitting element, located in a column different from a column in which the at least one second pixel circuit is located, among the second light emitting elements.

19 Claims, 13 Drawing Sheets

HIGH SPEED DRIVING
(DF>REF_FREQ)

DISPLAY PANEL, DISPLAY DRIVER AND DISPLAY DEVICE

This application claims priority to Korean Patent Applications No. 10-2022-0103822, filed on Aug. 19, 2022 and all the benefits accruing therefrom under 35 U.S.C. § 119, the content of which in its entirety is herein incorporated by reference.

BACKGROUND

1. Technical Field

Embodiments relate generally to display devices, and more particularly to display panels, display drivers, and display devices including the display panels and the display drivers.

2. Description of the Related Art

To display a full color image, a display device may include pixels emitting light of different colors, for example, red, green and blue pixels. In a conventional display device, the red, green and blue pixels may be arranged in a stripe (or linear) form such that pixels of the same color are arranged in each column.

To increase a resolution of a display screen, a display device having an RGBG pixel arrangement structure where a blue pixel and/or a red pixel are shared by two adjacent pixel groups (or unit pixels) has been developed. In the display device having the RGBG pixel arrangement structure, each pixel group (or each unit pixel) may have two pixels including one green pixel and one red or blue pixel. Accordingly, the unit pixel size may be reduced, and thus resolution of the display device may be increased.

However, in a conventional display device having the RGBG pixel arrangement structure, pixels having different colors (e.g., red and blue pixels) are alternately connected to a single data line, and thus power may be consumed in charging and discharging the data line such that data voltages for the pixels having different colors are alternately provided to the data line.

SUMMARY

Some embodiments provide a display panel capable of reducing power consumption and having uniform luminance.

Some embodiments provide a display driver that drives a display panel capable of reducing power consumption and having uniform luminance.

Some embodiments provide a display device including the display panel and the display driver.

According to some embodiments, there is provided a display panel of a display device. The display panel includes: first light emitting elements located in a first row, second light emitting elements located in a second row adjacent to the first row, first pixel circuits located in the first row, and second pixel circuits located in the second row. Each of the first pixel circuits drives a first light emitting element, located in a column the same as a column in which the each of the first pixel circuits is located, among the first light emitting elements. At least one second pixel circuit of the second pixel circuits drives a second light emitting element, located in a column different from a column in which the at least one second pixel circuit is located, among the second light emitting elements.

In embodiments, the first light emitting elements may include a first red light emitting element located in a first column, a first green light emitting element located in a second column, a first blue light emitting element located in a third column, and a second green light emitting element located in a fourth column. The second light emitting elements may include a second blue light emitting element located in the first column, a third green light emitting element located in the second column, a second red light emitting element located in the third column, and a fourth green light emitting element located in the fourth column.

In embodiments, the first pixel circuits may include a first red pixel circuit located in the first column, and configured to drive the first red light emitting element, a first green pixel circuit located in the second column, and configured to drive the first green light emitting element, a first blue pixel circuit located in the third column, and configured to drive the first blue light emitting element, and a second green pixel circuit located in the fourth column, and configured to drive the second green light emitting element. The second pixel circuits may include a third green pixel circuit located in the second column, and configured to driver the third green light emitting element, a second blue pixel circuit located in the third column, and configured to drive the second blue pixel light emitting element, and a fourth green pixel circuit located in the fourth column, and configured to drive the fourth green light emitting element.

In embodiments, an anode of the second blue light emitting element located in the first column may be extended such that the anode of the second blue light emitting element is connected to the second blue pixel circuit located in the third column.

In embodiments, the second pixel circuits may further include a dummy pixel circuit located in the first column, and configured to drive no light emitting element.

In embodiments, the second pixel circuits may further include a pixel circuit located in a fifth column, and the second red light emitting element located in the third column may be driven by the pixel circuit located in the fifth column among the second pixel circuits.

In embodiments, the first light emitting elements may include a first blue light emitting element located in a first column, a first green light emitting element located in a second column, a first red light emitting element located in a third column, and a second green light emitting element located in a fourth column. The second light emitting elements may include a second red light emitting element located in the first column, a third green light emitting element located in the second column, a second blue light emitting element located in the third column, and a fourth green light emitting element located in the fourth column.

In embodiments, the display panel may further include a first data line, a second data line, and a demultiplexer circuit configured to selectively connect an output channel of a display driver to the first data line or the second data line.

In embodiments, the demultiplexer circuit may include a first switch configured to connect the output channel to the first data line in response to a first connection control signal, and a second switch configured to connect the output channel to the second data line in response to a second connection control signal.

In embodiments, the demultiplexer circuit may perform a switching operation once in each horizontal time.

In embodiments, a frame period may include a first horizontal time, and a second horizontal time subsequent to the first horizontal time, and each of the first and second horizontal times may include a first period, and a second period subsequent to the first period. The demultiplexer circuit may connect the output channel to the first data line in the first period of the first horizontal time, may connect the output channel to the second data line in the second period of the first horizontal time and the first period of the second horizontal time, and may connect the output channel to the first data line in the second period of the second horizontal time.

In embodiments, an order of connecting the output channel to the first and second data lines in a horizontal time of a first frame period may be different from an order of connecting the output channel to the first and second data lines in a corresponding horizontal time of a second frame period.

In embodiments, each of a first frame period, and a second frame period subsequent to the first frame period may include a first horizontal time, and a second horizontal time subsequent to the first horizontal time, and each of the first and second horizontal times may include a first period, and a second period subsequent to the first period. A data voltage for a first color pixel may be applied to the first data line in the first period of the first horizontal time of the first frame period, a data voltage for a second color pixel may be applied to the second data line in the second period of the first horizontal time of the first frame period, a data voltage for another second color pixel may be applied to the second data line in the first period of the second horizontal time of the first frame period, a data voltage for another first color pixel may be applied to the first data line in the second period of the second horizontal time of the first frame period, the data voltage for the second color pixel may be applied to the second data line in the first period of the first horizontal time of the second frame period, the data voltage for the first color pixel may be applied to the first data line in the second period of the first horizontal time of the second frame period, the data voltage for the another first color pixel may be applied to the first data line in the first period of the second horizontal time of the second frame period, and the data voltage for the another second color pixel may be applied to the second data line in the second period of the second horizontal time of the second frame period.

In embodiments, each of two or more consecutive first frame period, and two or more consecutive second frame periods subsequent to the first frame periods may include a first horizontal time, and a second horizontal time subsequent to the first horizontal time, and each of the first and second horizontal times may include a first period, and a second period subsequent to the first period. A data voltage for a first color pixel may be applied to the first data line in the first period of the first horizontal time of each of the first frame periods, a data voltage for a second color pixel may be applied to the second data line in the second period of the first horizontal time of each of the first frame periods, a data voltage for another second color pixel may be applied to the second data line in the first period of the second horizontal time of each of the first frame periods, a data voltage for another first color pixel may be applied to the first data line in the second period of the second horizontal time of each of the first frame periods, the data voltage for the second color pixel may be applied to the second data line in the first period of the first horizontal time of each of the second frame periods, the data voltage for the first color pixel may be applied to the first data line in the second period of the first horizontal time of each of the second frame periods, the data voltage for the another first color pixel may be applied to the first data line in the first period of the second horizontal time of each of the second frame periods, and the data voltage for the another second color pixel may be applied to the second data line in the second period of the second horizontal time of each of the second frame periods.

In embodiments, the first data line may be located in a first column, and the second data line may be located in a second column directly adjacent to the first column.

In embodiments, the first data line may be located in a first column, and the second data line may be located in a third column spaced apart from the first column.

In embodiments, the demultiplexer circuit may perform a switching operation twice in each horizontal time when the display panel is driven at a first driving frequency less than or equal to a reference frequency, and may perform the switching operation once in each horizontal time when the display panel is driven at a second driving frequency greater than the reference frequency.

According to some embodiments, there is provided a display driver that drives a display panel including a first data line and a second data line. The display driver includes an output channel selectively connected to the first data line or the second data line. Each of a first frame period, and a second frame period subsequent to the first frame period includes a first horizontal time, and a second horizontal time subsequent to the first horizontal time, and each of the first and second horizontal times includes a first period, and a second period subsequent to the first period. The output channel outputs a data voltage for a first color pixel to the first data line in the first period of the first horizontal time of the first frame period, outputs a data voltage for a second color pixel to the second data line in the second period of the first horizontal time of the first frame period, outputs a data voltage for another second color pixel to the second data line in the first period of the first horizontal time of the second frame period, and outputs a data voltage for another first color pixel to the first data line in the second period of the first horizontal time of the second frame period.

In embodiments, the output channel may output the data voltage for the second color pixel to the second data line in the first period of the second horizontal time of the first frame period, may output the data voltage for the first color pixel to the first data line in the second period of the second horizontal time of the first frame period, may output the data voltage for the another first color pixel to the first data line in the first period of the second horizontal time of the second frame period, and may output the data voltage for the another second color pixel to the second data line in the second period of the second horizontal time of the second frame period.

According to some embodiments, there is provided a display device including a display panel including a plurality of data lines including a first data line and a second data line, a display driver configured to drive the display panel, and including a plurality of output channels including a first output channel, and a demultiplexer circuit configured to selectively connect the first output channel to the first data line or the second data line. The display panel further includes first light emitting elements located in a first row, second light emitting elements located in a second row adjacent to the first row, first pixel circuits located in the first row, and connected to the plurality of data lines, respectively, and second pixel circuits located in the second row, and connected to the plurality of data lines, respectively. Each of the first pixel circuits drives a first light emitting element located in a column the same as a column in which the each of the first pixel circuits is located among the first light emitting elements, and at least one second pixel circuit of the second pixel circuits drives a second light emitting element, located in a column different from a column in which the at least one second pixel circuit is located, among the second light emitting elements. Each of a first frame period, and a second frame period subsequent to the first frame period includes a first horizontal time, and a second horizontal time subsequent to the first horizontal time, and each of the first and second horizontal times includes a first period, and a second period subsequent to the first period. In the first period of the first horizontal time of the first frame period, the demultiplexer circuit connects the first output channel to the first data line, and the first output channel outputs a data voltage for a first color pixel to the first data line. In the second period of the first horizontal time of the first frame period, the demultiplexer circuit connects the first output channel to the second data line, and the first output channel outputs a data voltage for a second color pixel to the second data line. In the first period of the first horizontal time of the second frame period, the demultiplexer circuit connects the first output channel to the second data line, and the first output channel outputs the data voltage for the second color pixel to the second data line. In the second period of the first horizontal time of the second frame period, the demultiplexer circuit connects the first output channel to the first data line, and the first output channel outputs the data voltage for the first color pixel to the first data line.

As described above, in a display panel and a display device according to embodiments, each of first pixel circuits located in a first row may drive a light emitting element located in the same column among first light emitting elements located in the first row, and at least one pixel circuit of second pixel circuits located in a second row may drive a light emitting element located in a column different from a column in which the at least one pixel circuit is located among second light emitting elements located in the second row. Accordingly, pixel having the same color may be connected to each data line, and thus power consumption for charging and discharging the data line may be effectively reduced.

Further, in a display driver and a display device according to embodiments, an output order of data voltages in at least one horizontal time of a first frame period may be different from an output order of data voltages in a corresponding horizontal time of a second frame period. Accordingly, a display panel driven by the display driver may display an image with uniform luminance.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
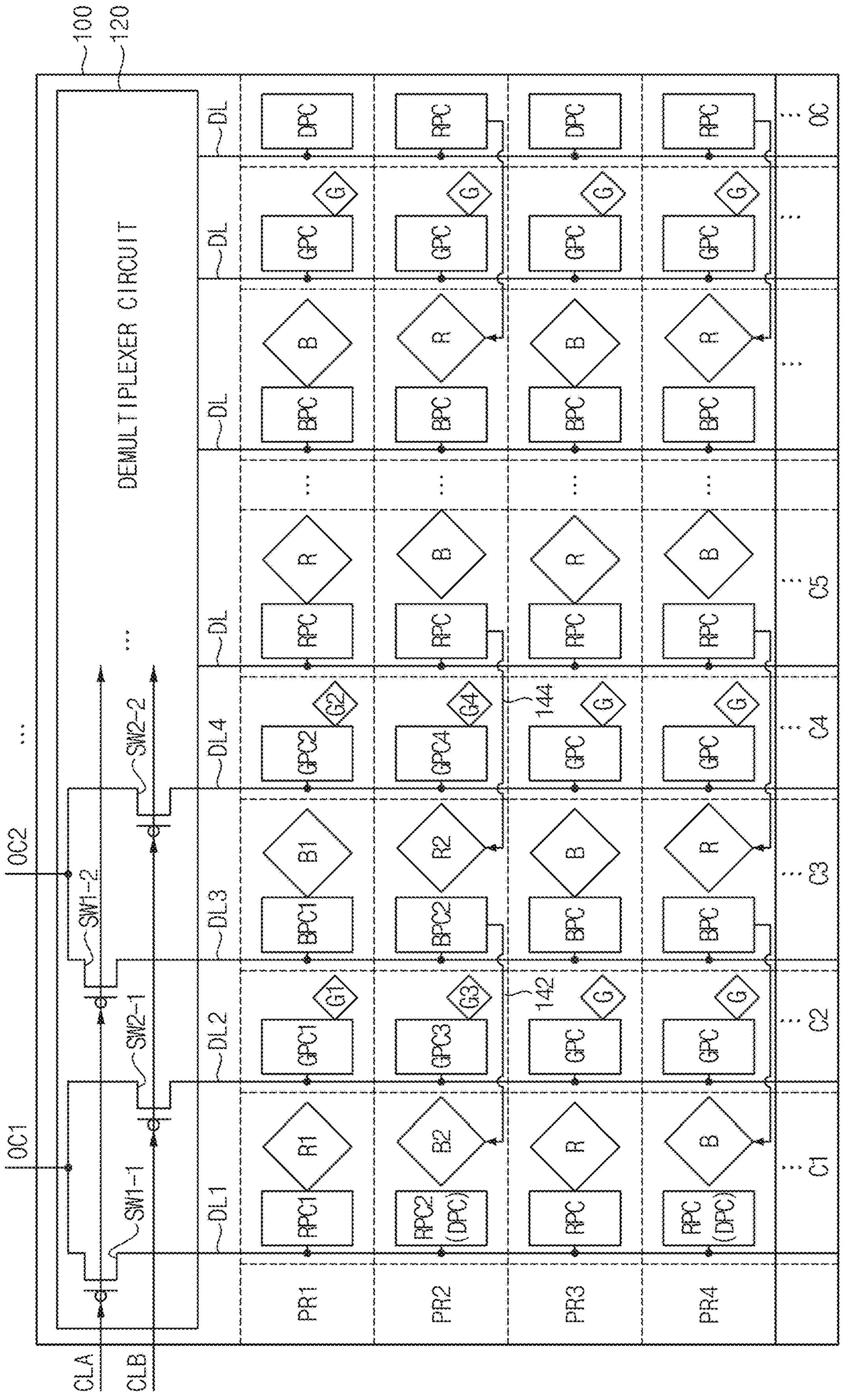
FIG. 1 is a diagram illustrating a display panel according to embodiments.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The embodiments are described more fully hereinafter with reference to the accompanying drawings. Like or similar reference numerals refer to like or similar elements throughout.

Figure 2:
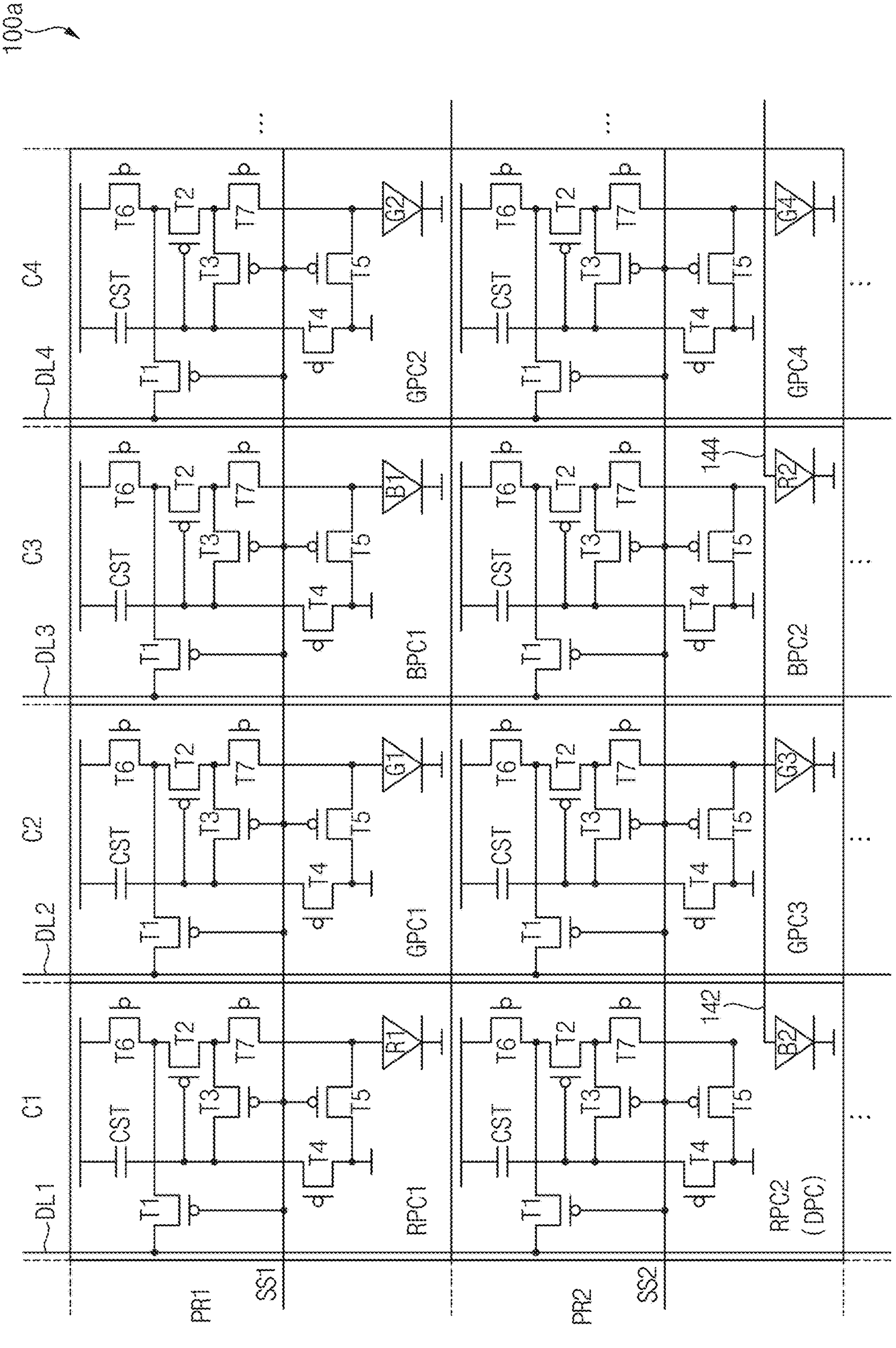
FIG. 2 is a circuit diagram illustrating an example of a portion of a display panel of FIG. 1.
Figure 3:
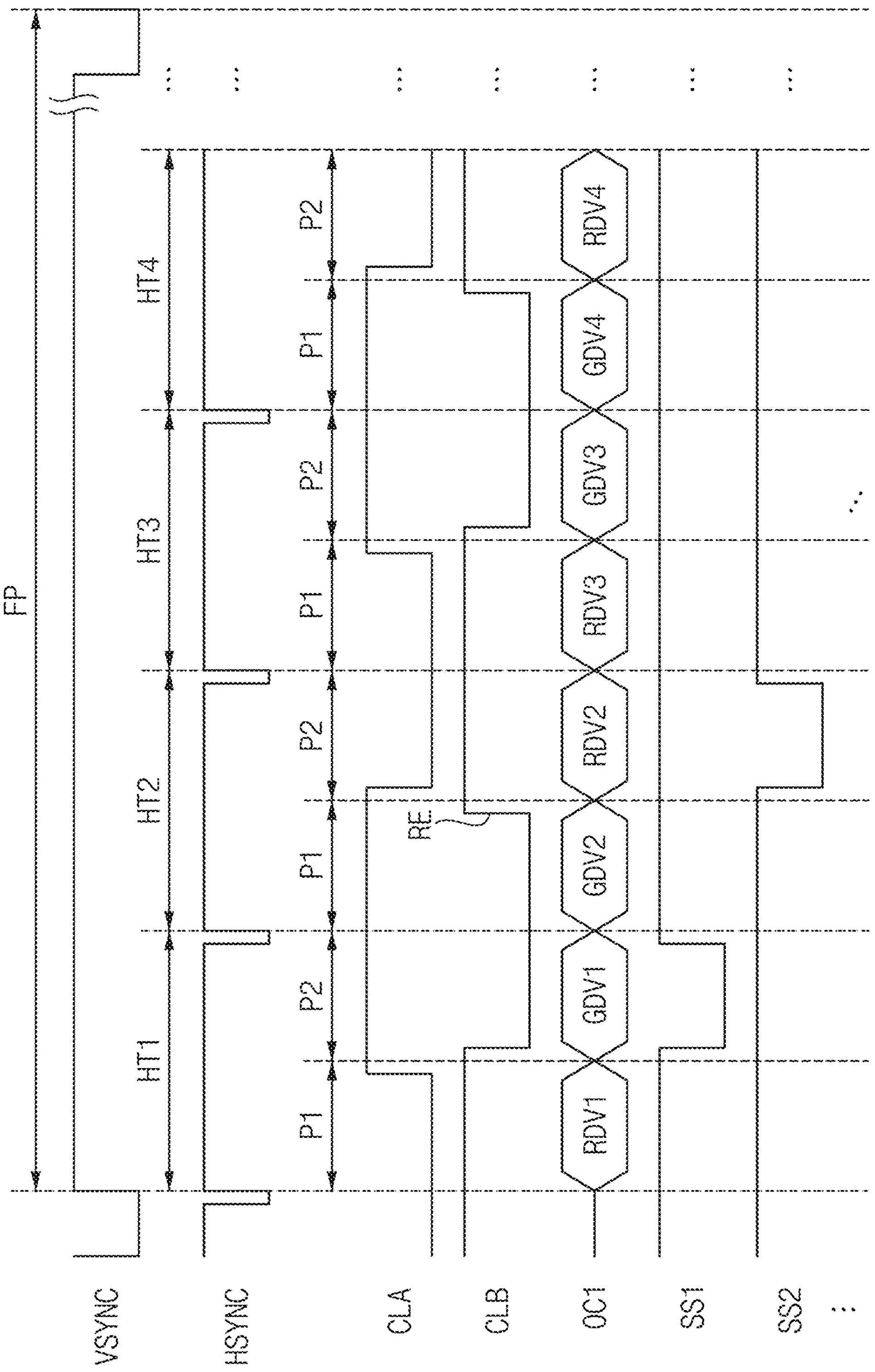
FIG. 3 is a timing diagram for describing an example of an operation of a demultiplexer circuit that performs a switching operation once in each horizontal time.
Figure 4:
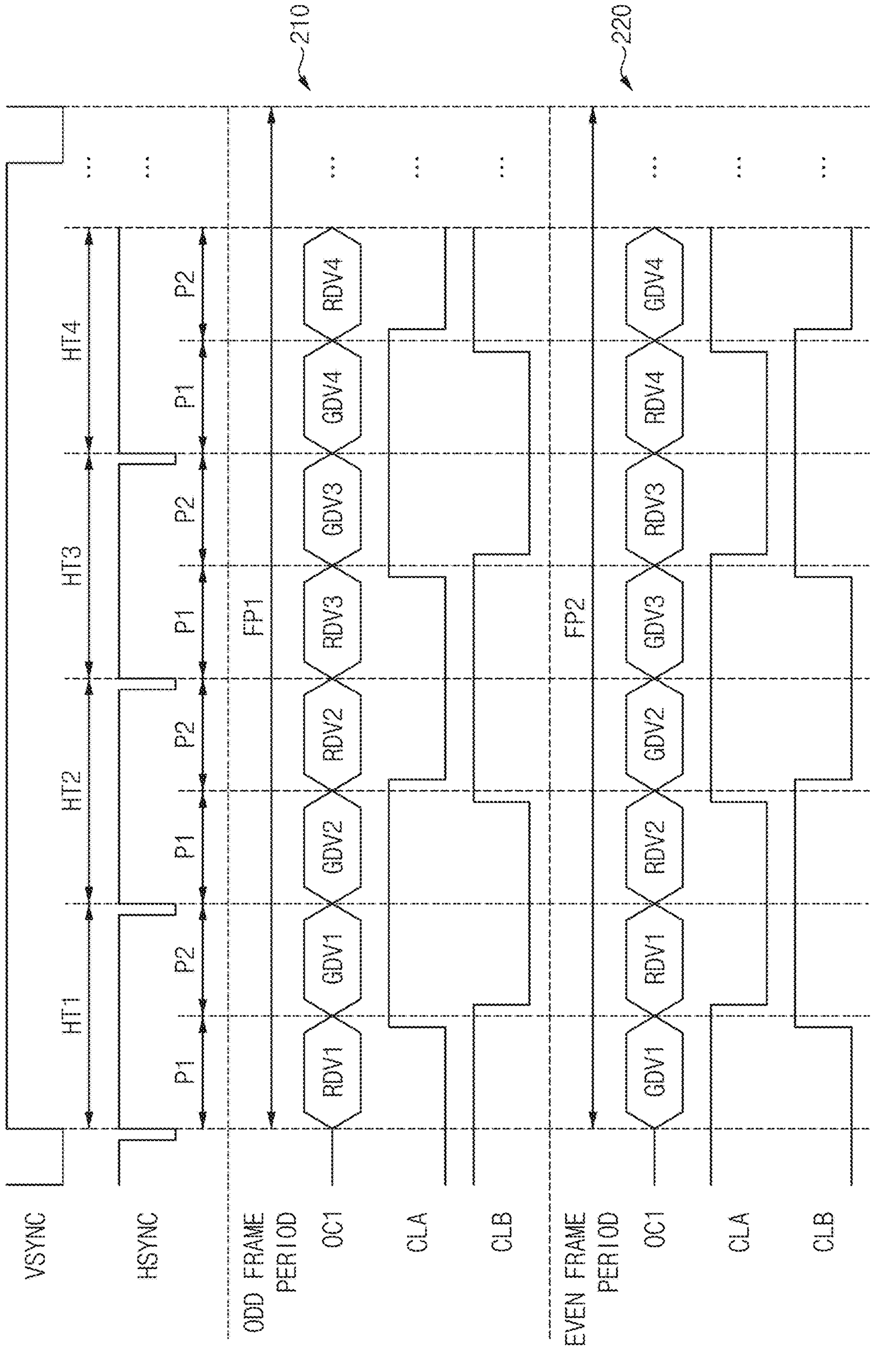
FIG. 4 is a timing diagram for describing an operation of a display panel according to embodiments.

FIG. 1 is a diagram illustrating a display panel according to embodiments, FIG. 2 is a circuit diagram illustrating an example of a portion of a display panel of FIG. 1, FIG. 3 is a timing diagram for describing an example of an operation of a demultiplexer circuit that performs a switching operation once in each horizontal time, and FIG. 4 is a timing diagram for describing an operation of a display panel according to embodiments.

Referring to FIG. 1, a display panel 100 according to embodiments may include a plurality of light emitting elements R1, G1, B1, G2, B2, G3, R2, G4, R, G and B, a plurality of pixel circuits RPC1, GPC1, BPC1, GPC2, RPC2, GPC3, BPC2, GPC4, RPC, GPC, BPC and DPC for driving the plurality of light emitting elements R1, G1, B1, G2, B2, G3, R2, G4, R, G and B, and a plurality of data lines DL1, DL2, DL3, DL4 and DL connected to the plurality of pixel circuits RPC1, GPC1, BPC1, GPC2, RPC2, GPC3, BPC2, GPC4, RPC, GPC, BPC and DPC. In some embodiments, the display panel 100 may further include a demultiplexer circuit 120.

In some embodiments, red, green, blue and green light emitting elements R1, G1, B1 and G2 may be repeatedly disposed in odd-numbered rows PR1 and PR3, and blue, green, and red and green light emitting elements B2, G3, R2 and G4 may be repeatedly disposed in even-numbered rows PR2 and PR4. In some embodiments, each light emitting element may be an organic light emitting diode ("OLED"), but is not limited thereto. In other embodiments, each light emitting element may be a nano light emitting diode ("NED"), a quantum dot ("QD") light emitting diode, a micro light emitting diode, an inorganic light emitting diode, or any other suitable light emitting element.

For example, as illustrated in FIG. 1, a first red light emitting element R1 may be disposed in a first row PR1 and a first column C1, a first green light emitting element G1 is disposed in the first row PR1 and a second column C2, a first blue light emitting element B1 may be disposed in the first row PR1 and a third column C3, and a second green light emitting element G2 may be disposed in the first row PR1 and a fourth column C4. Further, a second blue light emitting element B2 may be disposed in a second row PR2 and the first column C1, a third green light emitting element G3 may be disposed in the second row PR2 and the second column C2, a second red light emitting element R2 may be disposed in the second row PR2 and the third column C3, and a fourth green light emitting element G4 may be disposed in the second row PR2 and the fourth column C4. In some embodiments, one red light emitting element (e.g., R2), two green light emitting elements (e.g., G1 and G2) and one blue light emitting element (e.g., B1) that are adjacent to each other may be arranged in a diamond shape, but an arrangement of the light emitting elements is not limited thereto.

In the display panel 100 according to embodiments, pixel circuits for driving the light emitting elements having the same color may be disposed in each column C1, C2, C3, C4, C5, and OC, and each data line DL1, DL2, DL3, DL4 and DL may be connected to the pixel circuits for driving the light emitting elements having the same color.

For example, as illustrated in FIG. 1, a first red pixel circuit RPC1 for driving the first red light emitting element R1 may be disposed in the first row PR1 and the first column C1, a first green pixel circuit GPC1 for driving the first green light emitting element G1 may be disposed in the first row PR1 and the second column C2, a first blue pixel circuit BPC1 for driving the first blue light emitting element B1 may be disposed in the first row PR1 and the third column C3, and a second green pixel circuit GPC2 for driving the second green light emitting element G2 may be disposed in the first row PR1 and the fourth column C4. Further, a third green pixel circuit GPC3 for driving the third green light emitting element G3 may be disposed in the second row PR2 and the second column C2, a second blue pixel circuit BPC2 for driving the second blue light emitting element B2 may be disposed in the second row PR2 and the third column C3, and a fourth green pixel circuit GPC4 for driving the fourth green light emitting element G4 may be disposed in the second row PR2 and the fourth column C4. In some embodiments, a second red pixel circuit RPC2 may be disposed in the second row PR2 and the first column C1, but may be connected to no light emitting element. Thus, the second red pixel circuit RPC2 may be a dummy pixel circuit DPC that drives no light emitting element. Accordingly, only the red pixel circuits RPC1 and RPC2 may be connected to a first data line DL1, only the green pixel circuits GPC1 and GPC3 may be connected to a second data line DL2, only blue pixel circuits BPC1 and BPC2 may be connected to a third data line DL3, and only green pixel circuits GPC2 and GPC4 may be connected to a fourth data line DL4.

The red pixel circuit RPC1 and RPC2, the green pixel circuit GPC1, GPC2, GPC3 and GPC4 and the blue pixel circuit BPC1 and BPC2 may drive light emitting elements having different colors, but may have substantially the same structure. For example, as illustrated in FIG. 2, each pixel circuit of the display panel 100*a* may having a 7T1C structure including seven transistors T1, T2, T3, T4, T5, T6 and T7 and one capacitor CST. For example, each pixel circuit may include a first transistor T1 that transfers a data voltage to one terminal of a second transistor T2 in response to a scan signal SS1 and SS2, a storage capacitor CST that stores the data voltage transferred through the second transistor T2 that is diode-connected, a second transistor T2 that generates a driving current based on the data voltage stored in the storage capacitor CST, a third transistor T3 that diode-connects the second transistor T2 in response to the scan signal SS1 and SS2, a fourth transistor T4 that applies an initialization voltage to the storage capacitor CST and a gate of the second transistor T2 in response to an initialization signal, a fifth transistor T5 that applies the initialization voltage to the light emitting element in response to the scan signal SS1 and SS2, a sixth transistor T6 that connects a line of a power supply voltage to the second transistor T2 in response to an emission signal, and a seventh transistor T7 that connects the second transistor T2 to the light emitting element in response to the emission signal. Although FIG. 2 illustrates an example of a structure of each pixel circuit, the structure of each pixel circuit of the display panel 100 according to the embodiments is not limited to the example of FIG. 2.

In the display panel 100 according to embodiments, the light emitting elements R1, G1, B1, G2, B2, G3, R2, G4, R, G and B may be arranged in an RGBG pixel arrangement structure, but pixel circuits (e.g., BPC1 and BPC2) connected to each data line (e.g., DL3) may drive the light emitting elements (e.g., B1 and B2) having the same color. To achieve this configuration, each pixel circuit (e.g., BPC1) located in in an odd-numbered row (e.g., PR1) may drive a light emitting element (e.g., B1) located in a column (e.g., C3) the same as a column (e.g., C3) in which the pixel circuit (e.g., BPC1) is located, and at least one pixel circuit (e.g., BPC2) of the pixel circuits located in an even-numbered row (e.g., PR2) may drive a light emitting element (e.g., B2) located in a column (e.g., C1) different from a column (e.g., C3) in which the pixel circuit (e.g., BPC2) is located.

For example, as illustrated in FIG. 1, the first red, first green, first blue and second green pixel circuits RPC1, GPC1, BPC1 and GPC2 located in the first row PR1 and the first, second, third and fourth columns C1, C2, C3 and C4 may drive the first red, first green, first blue and second green light emitting elements R1, G1, B1 and G2 located in the first row PR1 and the first, second, third and fourth columns C1, C2, C3 and C4, respectively. Further, the third and fourth green pixel circuits GPC3 and GPC4 located in the second row PR2 and the second and fourth columns C2 and C4 may drive the third and fourth green light emitting elements G3 and G4 located in the second row PR2 and the second and fourth columns C2 and C4, respectively. Thus, the first, second, third and fourth green pixel circuits GPC1, GPC2, GPC3 and GPC4 and the first, second, third and fourth green light emitting elements G1, G2, G3 and G4 may form first, second, third and fourth green pixels, respectively, the first and third green pixels may be connected to the second data line DL2 located in the second column C2, and the second and fourth green pixels may be connected to the fourth data line DL4 located in the fourth column C4. Thus, data voltage only for green pixels may be provided to each of the second and fourth data lines DL2 and DL4.

Further, the second blue pixel circuit BPC2 located in the second row PR2 and the third column C3 may drive the second blue light emitting element B2 disposed in the second row PR2 and the first column C1. In order that the second blue pixel circuit BPC2 located in the third column C3 drives the second blue light emitting element B2 disposed in the first column C1, as illustrated in FIGS. 1 and 2, the second blue pixel circuit BPC2 and the second blue light emitting element B2 may be connected to each other through a connection line 142. In some embodiments, the connection line 142 may be an extension of an anode of the second blue light emitting element B2. In this case, when the second blue light emitting element B2 located in the first column C1 is formed, the anode of the second blue light emitting element B2 may be extended such that the anode of the second blue light emitting element B2 is connected to the second blue pixel circuit BPC2 located in the third column C3. In other embodiments, the connection line 142 may be a separate line different from the anode extension of the second blue light emitting element B2. The first blue pixel circuit BPC1 and the first blue light emitting element B1 located in the first row PR1 and the third column C3 may form a first blue pixel, and the second blue pixel circuit BPC2 located in the second row PR2 and the third column C3 and the second blue light emitting element B2 located in the second row PR2 and the first column C1 may form a second blue pixel. Accordingly, the first and second blue pixels may be connected to the third data line DL3 located in the third column C3, and thus data voltages only for blue pixels may be provided to the third data line DL3.

Further, the second red pixel circuit RPC2 disposed in the second row PR2 and the first column C1 may be a dummy pixel circuit DPC that does not drive the light emitting element. The first red pixel circuit RPC1 and the first red light emitting element R1 may form a first red pixel, the first red pixel may be connected to the first data line DL1 located in the first column C1, and thus data voltages only for red pixels may be provided to the first data line DL1. The second red light emitting element R2 located in the second row PR2 and the third column C3 may be connected to a red pixel circuit RPC disposed in the second row PR2 and a fifth column C5. In some embodiments, pixel circuits located in the odd-numbered rows PR1 and PR3 and located in an outer column OC may also be dummy pixel circuits DPC.

Accordingly, in the display panel 100 according to the embodiments, the light emitting elements R1, G1, B1, G2, B2, G3, R2, G4, R, G and B may be arranged in an RGBG pixel arrangement structure, pixels having the same color may be connected to each data line, and thus data voltages only for the pixels having the same color may be provided to each data line. In a conventional display device having the RGBG pixel arrangement structure, pixels having different colors may be connected to a single data line, and thus power may be consumed in charging and discharging the data line such that data voltages for the pixels having different colors are alternately provided to the data line. However, in a display panel including the display panel 100, data voltages only for the pixels having the same color may be provided to each data line, and thus power consumption for charging and discharging the data line may be effectively reduced.

A display driver for driving the display panel 100 may have output channels OC1 and OC2 smaller in number than the number of the data lines DL1, DL2, DL3, DL4 and DL of the display panel 100 (e.g., half of the number of the data lines), and the display panel 100 may include a demultiplexer circuit 120 for connecting the output channels OC1 and OC2 of the display driver to data lines selected among the plurality of data lines DL1, DL2, DL3, DL4 and DL. Although FIG. 1 illustrates an example where the demultiplexer circuit 120 is formed or integrated on the display panel 100, the location of the demultiplexer circuit 120 is not limited to the example of FIG. 1. For example, in other embodiments, the demultiplexer circuit 120 may be included in the display driver, or may be implemented as a separate integrated circuit.

In some embodiments, as illustrated in FIG. 1, the demultiplexer circuit 120 may include first switches SW1-1 and SWS1-2 that connect the output channels OC1 and OC2 to odd-numbered data lines DL1 and DL3 in response to a first connection control signal CLA, and second switches SW2-1 and SW2-2 that connect the output channels OC1 and OC2 to even-numbered data lines DL2 and DL4 in response to a second connection control signal CLB. For example, the first switch SW1-1 for a first output channel OC1 may connect the first output channel OC1 to the first data line DL1 located in the first column C1 in response to the first connection control signal CLA, and the second switch SW2-1 for the first output channel OC1 may connect the first output channel OC1 to the second data line DL2 located in the second column C2 immediately adjacent to the column C1 in response to the second connection control signal CLB. Further, the first switch SW1-2 for a second output channel OC2 may connect the second output channel OC2 to the third data line DL3 located in the third column C3 in response to the first connection control signal CLA, and the second switch SW2-2 for the second output channel OC2 may connect the second output channel OC2 to the fourth data line DL4 located in the fourth column C4 immediately adjacent to the third column C3. In some embodiments, in order that the first switches SW1-1 and SW1-2 and the second switches SW2-1 and SW2-2 are not substantially simultaneously turned on, at any time point, both of the first and second connection control signals CLA and CLB may not be substantially simultaneously activated, and only one of the first and second connection control signals CLA and CLB may be activated. In addition, in some embodiments, to prevent both of the first and second connection control signals CLA and CLB from being substantially simultaneously activated, as illustrated in FIGS. 3 and 4, the second connection control signal CLB may be activated (e.g., low signal level) after the first connection control signal CLA is deactivated (e.g., high signal level), and the first connection control signal CLA may be activated after the second connection control signal CLB is deactivated. In other embodiments, activation of one of the first and second connection control signals CLA and CLB and deactivation of the other of the first and second connection control signals CLA and CLB may be performed substantially simultaneously.

In some embodiments, the demultiplexer circuit 120 may perform a switching operation that switches data lines connected to each output channel once in each horizontal time. Since the number of switching operations of the demultiplexer circuit 120 is reduced by half compared to the number of switching operations of a conventional demultiplexer circuit that performs the switching operation twice in each horizontal time, this operation of the demultiplexer circuit 120 may be referred to as a half-frequency demultiplexing driving ("HFDD") operation.

For example, as illustrated in FIG. 3, each frame period FP defined by a vertical synchronization signal VSYNC may include a plurality of horizontal times HT1, HT2, HT3 and HT4 defined by a horizontal synchronization signal HSYNC. Here, the plurality of horizontal times HT1, HT2, HT3 and HT4 may be times allocated to the plurality of rows PR1, PR2, PR3 and PR4 of the display panel 100, respectively. Further, each horizontal time HT1, HT2, HT3 and HT4 may be divided into a first period P1 (e.g., a first half of each horizontal time), and a second period P2 (e.g., a second half of each horizontal time) subsequent to the first period P1.

In the first period P1 of a first horizontal time HT1, the demultiplexer circuit 120 may connect the first output channel OC1 to the first data line DL1 in response to the first connection control signal CLA, the first output channel OC1 may output a first red data voltage RDV1 for the first red pixel formed by the first red pixel circuit RPC1 and the first red light emitting element R1, and thus the first red data voltage RDV1 for the first red pixel may be provided to the first data line DL1. The demultiplexer circuit 120 may perform a switching operation that switches a data line connected to the first output channel OC1 from the first data line DL1 to the second data line DL2 between the first period P1 and the second period P2 of the first horizontal time HT1. In the second period P2 of the first horizontal time HT1, the demultiplexer circuit 120 may connect the first output channel OC1 to the second data line DL2 in response to the second connection control signal CLB, the first output channel OC1 may output a first green data voltage GDV1 for the first green pixel formed by the first green pixel circuit GPC1 and the first green light emitting element G1, and thus the first green data voltage GDV1 for the first green pixel may be provided to the second data line DL2. Further, in the second period P2 of the first horizontal time HT1, a first scan signal SS1 may be applied to the first red pixel circuit RPC1 and the first green pixel circuit GPC1, the first red pixel circuit RPC1 may store the first red data voltage RDV1 of the first data line DL1 in response to the first scan signal SS1, and the first green pixel circuit GPC1 may store the first green data voltage GDV1 of the second data line DL2 in response to the first scan signal SS1. That is, the first red data voltage RDV1 applied to the first data line DL1 in the first period P1 of the first horizontal time HT1 and the first green data voltage GDV1 applied to the second data line DL2 in the second period P2 of the first horizontal time HT1 may be substantially simultaneously applied to the first red pixel and the first green pixel based on the first scan signal SS1 in the second period P2 of the first horizontal time HT1.

The demultiplexer circuit 120 may not perform the switching operation between the second period P2 of the first horizontal time HT1 and the first period P1 of a second horizontal time HT2. In the first period P1 of the second horizontal time HT2, the demultiplexer circuit 120 may connect the first output channel OC1 to the second data line DL2 in response to the second connection control signal CLB as in the second period P2 of the first horizontal time HT1, the first output channel OC1 may output a second green data voltage GDV2 for the third green pixel formed by the third green pixel circuit GPC3 and the third green light emitting element G3, and thus the second green data voltage GDV2 for the third green pixel may be provided to the second data line DL2. The demultiplexer circuit 120 may perform a switching operation that switches the data line connected to the first output channel OC1 from the second data line DL2 to the first data line DL1 between the first period P1 and the second period P2 of the second horizontal time HT2. In the second period P2 of the second horizontal time HT2, the demultiplexer circuit 120 may connect the first output channel OC1 to the first data line DL1 in response to the first connection control signal CLA, the first output channel OC1 may output a second red data voltage RDV2 (or a red dummy data voltage) for a second red pixel (or a red dummy pixel) formed by the second red pixel circuit RPC2, and thus the second red data voltage RDV2 for the second red pixel may be provided to the first data line DL1. Further, in the second period P2 of the second horizontal time HT2, a second scan signal SS2 may be applied to the second red pixel circuit RPC2 and the third green pixel circuit GPC3, the second red pixel circuit RPC2 may store the second red data voltage RDV2 of the first data line DL1 in response to the second scan signal SS2, and the third green pixel circuit GPC3 may store the second green data voltage GDV2 of the second data line DL2 in response to the second scan signal SS2. That is, the second green data voltage GDV2 applied to the second data line DL2 in the first period P1 of the second horizontal time HT2 and the second red data voltage RDV2 applied to the first data line DL1 in the second period P2 of the second horizontal time HT2 may be substantially simultaneously applied to the third green pixel and the second red pixel based on the second scan signal SS2 in the second period P2 of the second horizontal time HT2.

A third red data voltage RDV3 for the red pixel formed by the red pixel circuit RPC and the red light emitting element R in the third row PR3 and the first column C1 and a third green data voltage GDV3 for the green pixel formed by the green pixel circuit GPC and the green light emitting element in the third row PR3 and the second column C2 may be sequentially provided to the first data line DL1 and the second data line DL2 in the first period P1 and the second period P2 of a third horizontal time HT3, respectively, and a fourth green data voltage GDV4 for the green pixel formed by the green pixel circuit GPC and the green light emitting element in the fourth row PR4 and the second column C2 and a fourth red data voltage RDV4 (or a red dummy data voltage) for a red pixel (or a red dummy pixel) formed by the red pixel circuit RPC in the fourth row PR4 and the first column C1 may be sequentially provided to the second data line DL2 and the first data line DL1 in the first period P1 and the second period P2 of a fourth horizontal time HT4, respectively.

Similarly, by the second output channel OC2 and the demultiplexer circuit 120, a blue data voltage for the first blue pixel circuit BPC1 and a green data voltage for the second green pixel circuit GPC2 may be sequentially provided to the third data line DL3 and the fourth data line DL4 in the first horizontal time HT1, respectively, a green data voltage for the fourth green pixel circuit GPC4 and a blue data voltage for the second blue pixel circuit BPC2 may be sequentially provided to the fourth data line DL4 and the third data line DL3 in the second horizontal time HT2, respectively, a blue data voltage for the blue pixel circuit BPC in the third row PR3 and the third column C3 and a green data voltage for the green pixel circuit GPC in the third row PR3 and the fourth column C4 may be sequentially provided to the third data line DL3 and the fourth data line DL4 in the third horizontal time HT3, respectively, and a green data voltage for the green pixel circuit GPC in the fourth row PR4 and the fourth column C4 and a blue data voltage for the blue pixel circuit BPC in the fourth row PR4 and the third column C3 may be sequentially provided to the fourth data line DL4 and the third data line DL3 in the fourth horizontal time HT4, respectively.

Accordingly, although the switching operation may be performed only once in each horizontal time HT1, HT2, HT3 and HT4, each output channel (e.g., OC1) may sequentially provide data voltages to two data lines (e.g., DL1 and DL2) in each horizontal time HT1, HT2, HT3 and HT4. The demultiplexer circuit 120 performing the HFDD operation can reduce the power consumption for the switching operation compared to a conventional demultiplexer circuit.

However, in a case where the demultiplexer circuit 120 performs the HFDD operation, luminance of pixels in odd-numbered rows PR1 and PR3 and luminance of pixels in even-numbered rows PR2 and PR4 may be different from each other. For example, as illustrated in FIG. 3, the first green data voltage GDV1 for the first green pixel formed by the first green pixel circuit GPC1 and the first green light emitting element G1 located in the first row PR1 may be substantially simultaneously provided, in the same period, or the second period P2, from the first output channel OC1 to the second data line DL2, and from the second data line DL2 to the first green pixel circuit GPC1. However, the second green data voltage GDV2 for the third green pixel formed by the third green pixel circuit GPC3 and the third green light emitting element G3 located in the second row PR2 may be provided from the first output channel OC1 to the second data line DL2 in the first period P1, but may be provided from the second data line DL2 to the third green pixel circuit GPC3 in the second period P2. Further, due to coupling between a line of the second connection control signal CLB and the second data line DL2, at an end time point of the first period P1, or a rising edge RE of the second connection control signal CLB, the second green data voltage GDV2 of the second data line DL2 may be changed (e.g., increased) from a desired voltage level. Thus, the first green data voltage GDV1 having a desired voltage level may be stored in the first green pixel, and the first green pixel located in the first row PR1 may emit light with desired luminance. However, the second green data voltage GDV2 having a voltage level different from (e.g., higher than) the desired voltage level may be stored in the third green pixel located, and the third green pixel in the second row PR2 may emits light with luminance different from (e.g., lower than) the desired luminance. That is, by the data voltage change due to this coupling, the pixels in the odd-numbered rows PR1 and PR3 and the pixels in the even-numbered rows PR2 and PR4 may not have uniform luminance.

In a display device including the display panel 100 according to embodiments, in order that the pixels in the odd-numbered rows PR1 and PR3 and the pixels in the even-numbered rows PR2 and PR4 may have uniform luminance, an order of connecting each output channel to data lines (or an output order of data voltages by each output channel) in each horizontal time of a first frame period may be different from the order of connecting each output channel to the data lines (or the output order of data voltages by each output channel) in a corresponding horizontal time of a second frame period different from the first frame period. In some embodiments, the order of connecting each output channel to the data lines (or the output order of data voltages by each output channel) may be changed per frame period.

FIG. 4 illustrates timings 210 of the first output channel OC1, the first connection control signal CLA and the second connection control signal CLB in an odd-numbered frame period or the first frame period FP1, and timings 220 for the first output channel OC1, the first connection control signal CLA and the second connection control signal CLB in an even-numbered frame period or the second frame period FP2. For example, as illustrated in FIG. 4, in the first horizontal time HT1 of the odd-numbered frame period or the first frame period FP1, the demultiplexer circuit 120 may sequentially connect the first output channel OC1 to the first and second data lines DL1 and DL2 in the order of the first data line DL1 and the second data line DL2 in response to the first and second connection control signals CLA and CLB that are sequentially activated in the order of the first connection control signal CLA and the second connection control signal CLB, and the first output channel OC1 may sequentially output the first red data voltage RDV1 and the first green data voltage GDV1. In the second horizontal time HT2 of the first frame period FP1, the demultiplexer circuit 120 may sequentially connect the first output channel OC1 to the first and second data lines DL1 and DL2 in the order of the second data line DL2 and the first data line DL1 in response to the first and second connection control signals CLA and CLB that are sequentially activated in the order of the second connection control signal CLB and the first connection control signal CLA, and the first output channel OC1 may sequentially output the second green data voltage GDV2 and the second red data voltage RDV2. Further, as described above, at the end time point of the first period P1 of the second horizontal time HT2, or at the rising edge RE of the second connection control signal CLB, the second green data voltage GDV2 of the second data line DL2 may be changed (e.g., increased) by the coupling between the line of the second connection control signal CLB and the second data line DL2, and the third green pixel may emit light with luminance different from (e.g., lower than) the desired luminance based on the changed (e.g., increased) second green data voltage GDV2. That, in the odd-numbered frame period or the first frame period FP1, the third green pixel located in the second row PR2 may emit light with relatively low luminance compared to the first green pixel located in the first row PR1.

However, in the first horizontal time HT1 of the even-numbered frame period or the second frame period FP2, the demultiplexer circuit 120 may sequentially connect the first output channel OC1 to the first and second data lines DL1 and DL2 in the order of the second data line DL2 and the first data line DL1 in response to the first and second connection control signals CLA and CLB that are sequentially activated in the order of the second connection control signal CLB and the first connection control signal CLA, and the first output channel OC1 may sequentially output the first green data voltage GDV1 and the first red data voltage RDV1. In the second horizontal time HT2 of the second frame period FP2, the demultiplexer circuit 120 may sequentially connect the first output channel OC1 to the first and second data lines DL1 and DL2 in the order of the first data line DL1 and the second data line DL2 in response to the first and second connection control signals CLA and CLB that are sequentially activated in the order of the first connection control signal CLA and the second connection control signal CLB, and the first output channel OC1 may sequentially output the second red data voltage RDV2 and the second green data voltage GDV2. In this case, at the end time point of the first period P1 of the first horizontal time HT1, or at the rising edge of the second connection control signal CLB, the first green data voltage GDV1 of the second data line DL2 may be changed (e.g., increased) by the coupling between the line of the second connection control signal CLB and the second data line DL2, and the first green pixel may emit light with luminance different from (e.g., lower than) the desired luminance based on the changed (e.g., increased) first green data voltage GDV1. That, in the even-numbered frame period or the second frame period FP2, the first green pixel located in the first row PR1 may emit light with relatively low luminance compared to the third green pixel located in the second row PR2. In other words, in the even-numbered frame period or the second frame period FP2, the third green pixel located in the second row PR2 may emit light with relatively high luminance compared to the first green pixel located in the first row PR1.

In this way, although a data voltage is applied to a data line in the first period P1, the data voltage is distorted by the coupling between the data line and the lines of the first and second connection control signals CLA and CLB at the end time point of the first period P1 or a start time point of the second period P2, and the distorted data voltage is applied to the pixel in the second period P2, rows of the pixels may be changed or switched between the odd-numbered frame period and the even-numbered frame period. Accordingly, the display panel 100 according to embodiments may display an image with uniform luminance. For example, although the third green pixel located in the second row PR2 may emit light with relatively low luminance compared to the first green pixel located in the first row PR1 in the odd-numbered frame period, the third green pixel located in the second row PR2 may emit light with relatively high luminance compared to the first green pixel located in the first row PR1 in the even-numbered frame period. Thus, the first green pixel located in the first row PR1 and the third green pixel located in the second row PR2 may have substantially the same luminance over a plurality of frame periods.

As described above, in the display panel 100 according to embodiments, at least one pixel circuit (e.g., BPC2) may drive a light emitting element (e.g., B2) located in a column different from a column in which the pixel circuit is disposed. Accordingly, in the display panel 100 according to embodiments, data voltages for pixels having the same color may be provided to each data line, and power consumption for charging and discharging the data line may be effectively reduced. Further, the demultiplexer circuit 120 of the display panel 100 according to embodiments may perform the HFDD operation, thereby further reducing the power consumption for the switching operation. In addition, in the display panel 100 according to embodiments, the order of connecting each output channel to the data lines or the output order of the data voltages by each output channel may be changed or switched between the odd-numbered frame period and the even-numbered frame period. Accordingly, the display panel 100 according to embodiments may display an image with uniform luminance.

Figure 5:
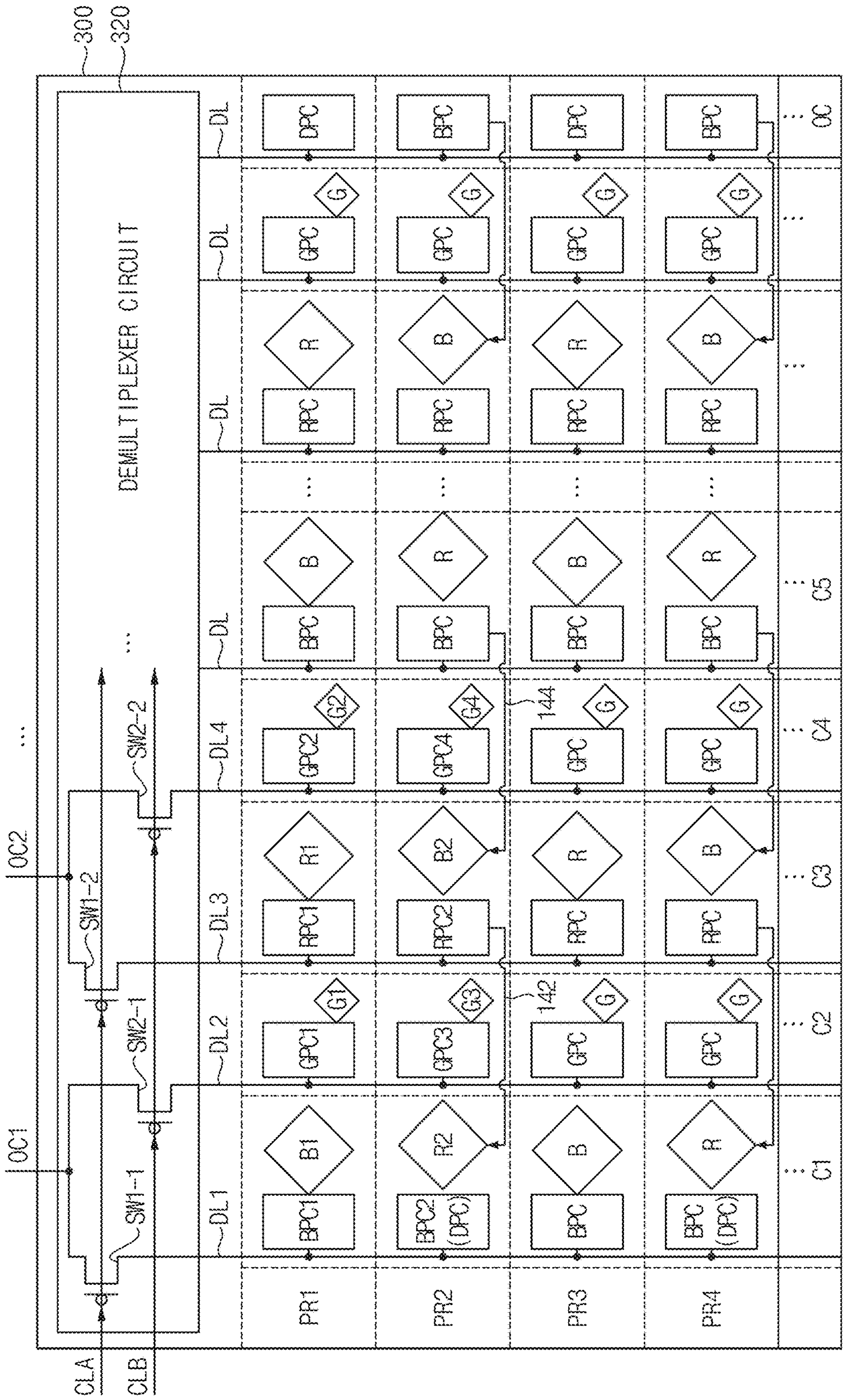
FIG. 5 is a diagram illustrating a display panel according to embodiments.
Figure 6:
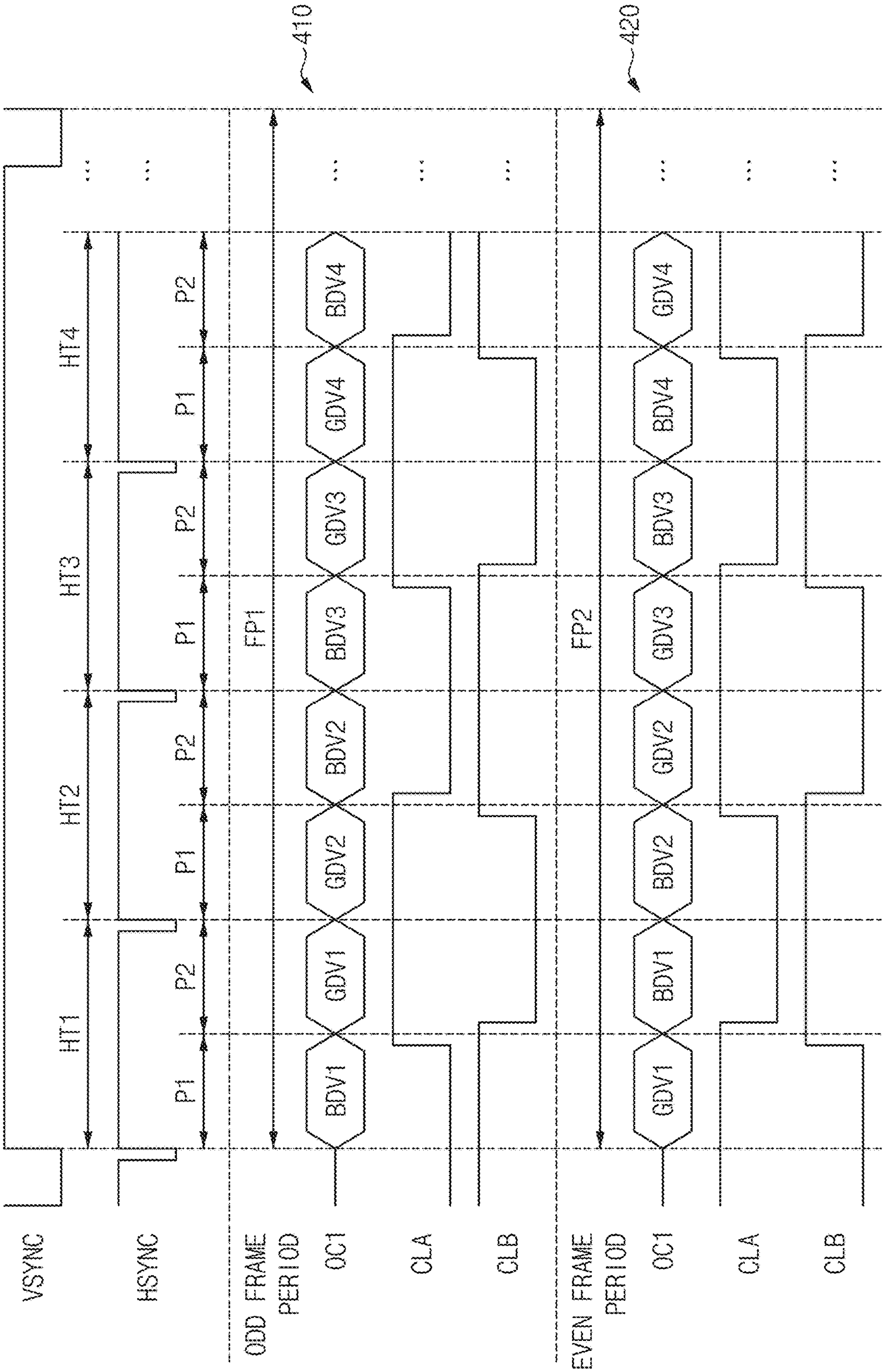
FIG. 6 is a timing diagram for describing an operation of a display panel according to embodiments.

FIG. 5 is a diagram illustrating a display panel according to embodiments, and FIG. 6 is a timing diagram for describing an operation of a display panel according to embodiments.

Referring to FIG. 5, a display panel 300 according to embodiments may include a plurality of light emitting elements R1, G1, B1, G2, B2, G3, R2, G4, R, G and B, a plurality of pixel circuits RPC1, GPC1, BPC1, GPC2, RPC2, GPC3, BPC2, GPC4, RPC, GPC, BPC and DPC, a plurality of data lines DL1, DL2, DL3, DL4 and DL and a demultiplexer circuit 320. The display panel 300 of FIG. 5 may have substantially the same configuration and operation as those of a display panel 100 of FIG. 1, except that blue, green, red and green light emitting elements B1, G1, R1 and G2 may be repeatedly disposed in odd-numbered rows PR1 and PR3, red, green, blue and green light emitting elements R2, G3, B2 and G4 may be repeatedly disposed in even-numbered rows PR2 and PR4, a first data line DL1 and blue pixel circuits BPC1, BPC2 and BPC connected to the first data line DL1 may be disposed in a first column C1, and a third data line DL3 and red pixel circuits RPC1, RPC2 and RPC connected to the third data line DL3 may be disposed in a third column C3.

FIG. 6 illustrates timings 410 of a first output channel OC1, a first connection control signal CLA and a second connection control signal CLB in an odd-numbered frame period or a first frame period FP1, and timings 420 of the first output channel OC1, the first connection control signal CLA and the second connection control signal CLB in an even-numbered frame period or a second frame period FP2. As illustrated in FIG. 6, in the odd-numbered frame period or the first frame period FP1, the demultiplexer circuit 320 may sequentially connect the first output channel OC1 to the first and second data lines DL1 and DL2 in the order of the first data line DL1 and the second data line DL2 in a first horizontal time HT1, may sequentially connect the first output channel OC1 to the first and second data lines DL1 and DL2 in the order of the second data line DL2 and the first data line DL1 in a second horizontal time HT2, may sequentially connect the first output channel OC1 to the first and second data lines DL1 and DL2 in the order of the first data line DL1 and the second data line DL2 in a third horizontal time HT3, and may sequentially connect the first output channel OC1 to the first and second data lines DL1 and DL2 in the order of the second data line DL2 and the first data line DL1 in a fourth horizontal time HT4. Further, the first output channel OC1 may sequentially output a first blue data voltage BDV1 and a first green data voltage GDV1 in the first horizontal time HT1, may sequentially output a second green data voltage GDV2 and a second blue data voltage BDV2 in the second horizontal time HT2, may sequentially output a third blue data voltage BDV3 and a third green data voltage GDV3 in the third horizontal time HT3, and may sequentially output a fourth green data voltage GDV4 and a fourth blue data voltage BDV4 in the fourth horizontal time HT4.

However, unlike in the first frame period FP1, in the even-numbered frame period or the second frame period FP2, the demultiplexer circuit 320 may sequentially connect the first output channel OC1 to the first and second data lines DL1 and DL2 in the order of the second data line DL2 and the first data line DL1 in the first horizontal time HT1, may sequentially connect the first output channel OC1 to the first and second data lines DL1 and DL2 in the order of the first data line DL1 and the second data line DL2 in the second horizontal time HT2, may sequentially connect the first output channel OC1 to the first and second data lines DL1 and DL2 in the order of the second data line DL2 and the first data line DL1 in the third horizontal time HT3, and may sequentially connect the first output channel OC1 to the first and second data lines DL1 and DL2 in the order of the first data line DL1 and the second data line DL2 in the fourth horizontal time HT4. Further, in the second frame period FP2, the first output channel OC1 may sequentially output the first green data voltage GDV1 and the first blue data voltage BDV1 in the first horizontal time HT1, may sequentially output the second blue data voltage BDV2 and the second green data voltage GDV2 in the second horizontal time HT2, may sequentially output the third green data voltage GDV3 and the blue data voltage BDV3 in the third horizontal time HT3, and may sequentially output the fourth blue data voltage BDV4 and the fourth green data voltage GDV4 in the fourth horizontal time HT4. Accordingly, since the rows affected by the coupling are switched between the odd-numbered frame period and the even-numbered frame period, the display panel 300 according to embodiments may display an image with uniform luminance.

Figure 7:
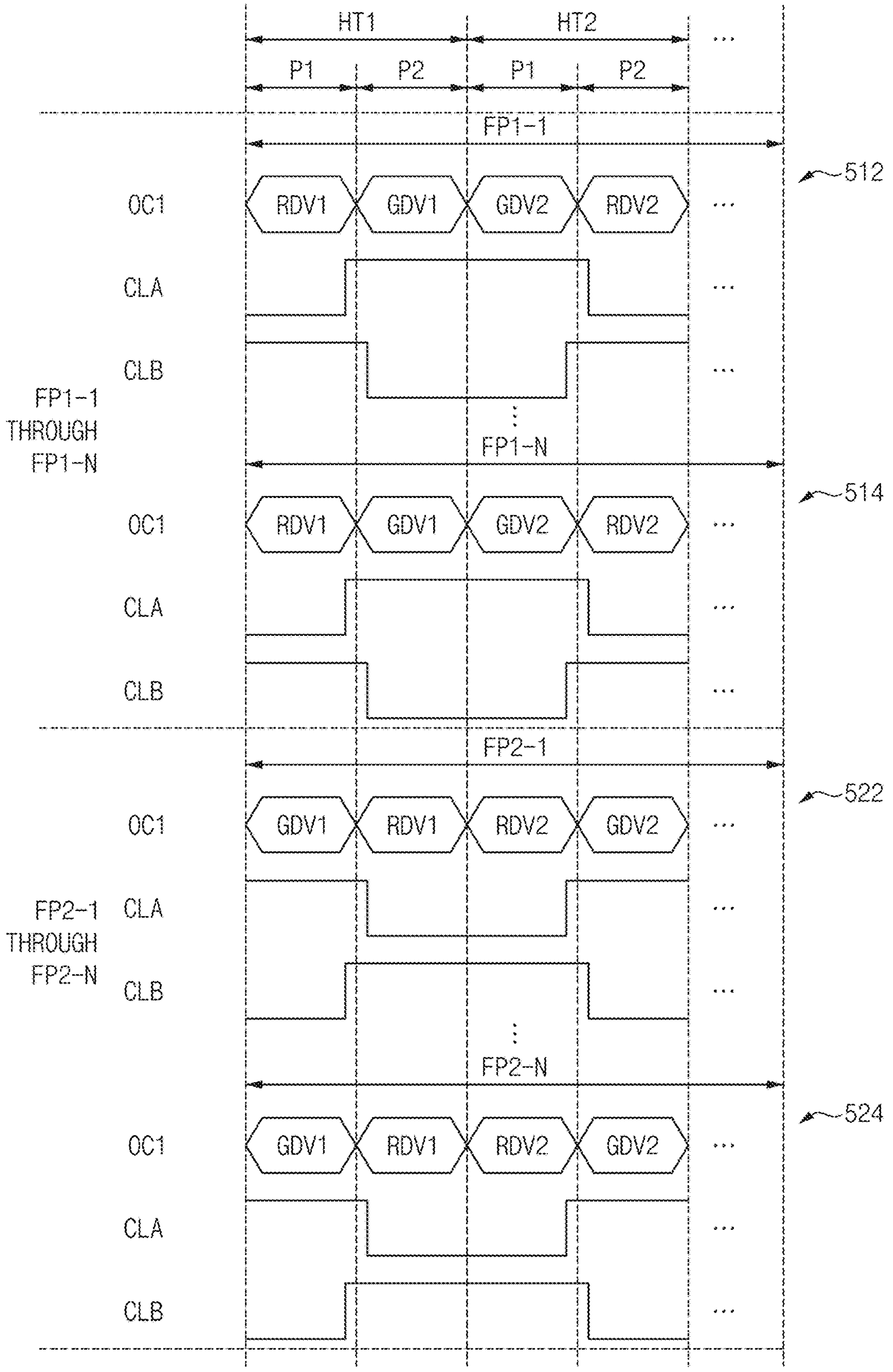
FIG. 7 is a timing diagram for describing an operation of a display panel according to embodiments.

FIG. 7 is a timing diagram for describing an operation of a display panel according to embodiments.

FIG. 7 illustrates timings 512 and 514 of a first output channel OC1, a first connection control signal CLA and a second connection control signal CLB in N consecutive first frame periods FP1-1, FP1-N, and timings 522 and 524 of the first output channel OC1, the first connection control signal CLA and the second connection control signal CLB in N consecutive second frame periods FP2-1, . . . , FP2-N, where N is an integer greater than 1.

Referring to FIGS. 1 and 7, in each of the N consecutive first frame periods FP1-1, FP1-N, a demultiplexer circuit 120 may sequentially connect the first output channel OC1 to first and second data lines DL1 and DL2 in the order of the first data line DL1 and the second data line DL2 in a first horizontal time HT1, and may sequentially connect the first output channel OC1 to the first and second data lines DL1 and DL2 in the order of the second data line DL2 and the first data line DL1 in a second horizontal time HT2. Further, in each of the N consecutive first frame periods FP1-1, FP1-N, the first output channel OC1 may sequentially output a first red data voltage RDV1 and a first green data voltage GDV1 in the first horizontal time HT1, and may sequentially output a second green data voltage GDV2 and a second red data voltage RDV2 in the second horizontal time HT2.

However, in each of the N consecutive second frame periods FP2-1, FP2-N subsequent to the N consecutive first frame periods FP1-1, FP1-N, the demultiplexer circuit 120 may sequentially connect the first output channel OC1 to the first and second data lines DL1 and DL2 in the order of the second data line DL2 and the first data line DL1 in the first horizontal time HT1, and may sequentially connect the first output channel OC1 to the first and second data lines DL1 and DL2 in the order of the first data line DL1 and the second data line DL2 in the second horizontal time HT2. Further, in each of the N consecutive second frame periods FP2-1, FP2-N, the first output channel OC1 may sequentially output the first green data voltage GDV1 and the first red data voltage RDV1 in the first horizontal time HT1, and may sequentially output the second red data voltage RDV2 and the second green data voltage GDV2 in the second horizontal time HT2. Accordingly, since the rows affected by the coupling are switched between the N consecutive first frame periods FP1-1, FP1-N and the N consecutive second frame periods FP2-1, . . . , FP2-N, the display panel 100 according to embodiments may display an image with uniform luminance.

Figure 8:
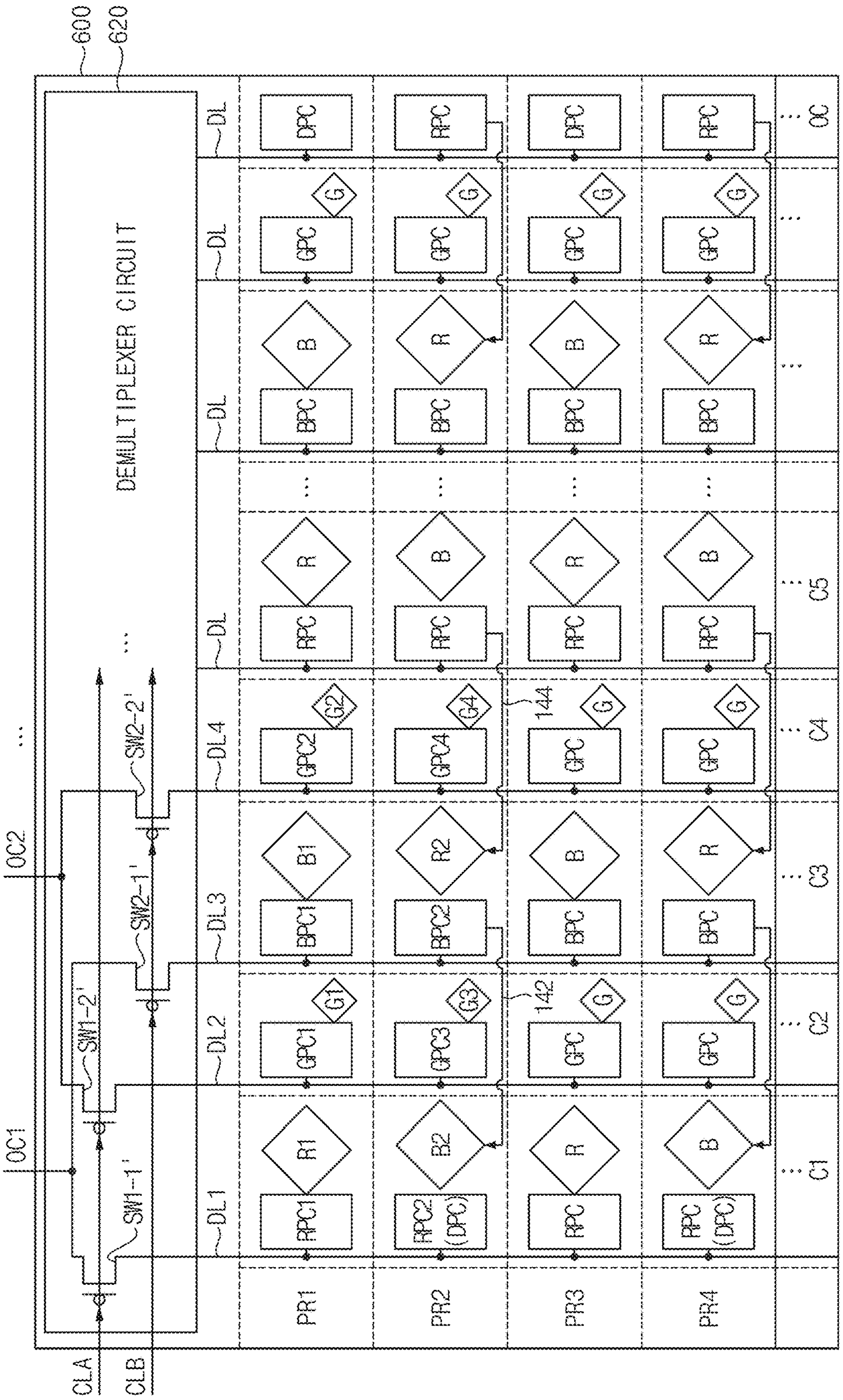
FIG. 8 is a diagram illustrating a display panel according to embodiments.
Figure 9:
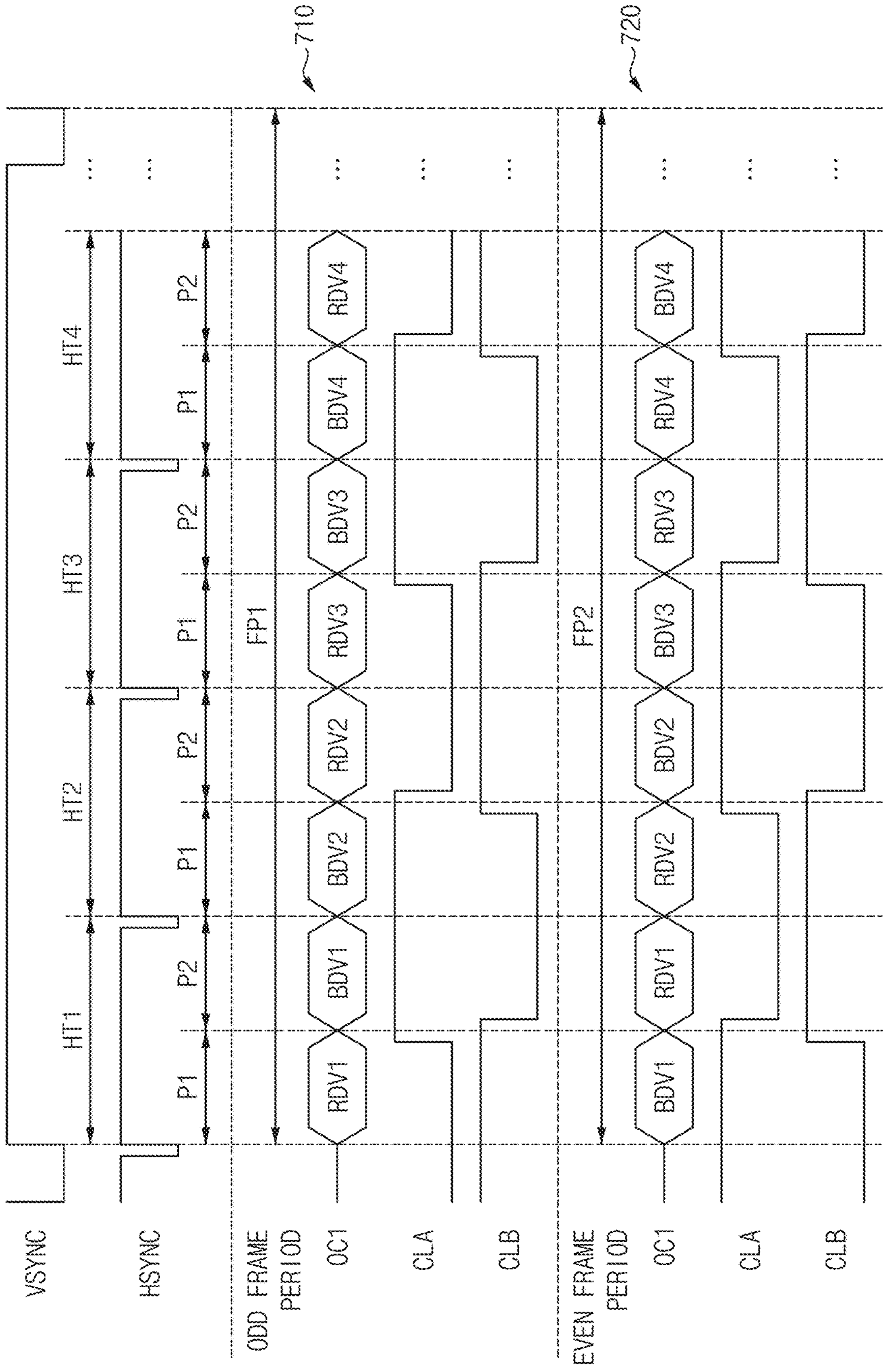
FIG. 9 is a timing diagram for describing an operation of a display panel according to embodiments.

FIG. 8 is a diagram illustrating a display panel according to embodiments, and FIG. 9 is a timing diagram for describing an operation of a display panel according to embodiments.

Referring to FIG. 8, a display panel 600 according to embodiments may include a plurality of light emitting elements R1, G1, B1, G2, B2, G3, R2, G4, R, G and B, a plurality of pixel circuits RPC1, GPC1, BPC1, GPC2, RPC2, GPC3, BPC2, GPC4, RPC, GPC, BPC and DPC, a plurality of data lines DL1, DL2, DL3, DL4 and DL and a demultiplexer circuit 620. The display panel 600 of FIG. 8 may have substantially the same configuration and operation as those of a display panel 100 of FIG. 1, except that the demultiplexer circuit 620 may selectively connect a (2M-1)-th output channel OC1 to a (4M-3)-th data line DL1 or a (4M-1)-th data line DL3, and may selectively connect a (2M)-th output channel OC2 to a (4M-2)-th data line DL2 or (4M)-th data line DL4, where M is an integer greater than or equal to 1.

In some embodiments, as illustrated in FIG. 8, the demultiplexer circuit 620 may include first switches SW1-1' and SW1-2' that connect the output channels OC1 and OC2 to the (4M-3)-th data lines DL1 and the (4M-2)-th data lines DL2 in response to a first connection control signal CLA, and second switches SW2-1' and SW2-2' that connect the output channels OC1 and OC2 to the (4M-1)-th data lines DL3 and the (4M)-th data lines DL4 in response to the second connection control signal CLB. For example, the first switch SW1-1' for a first output channel OC1 may connect the first output channel OC1 to a first data line DL1 in a first column C1 in response to the first connection control signal CLA, and the second switch SW2-1' for the first output channel OC1 may connect the first output channel OC1 to a third data line DL3 disposed in a third column C3 spaced apart from the first column C1 by one column C2 in response to the second connection control signal CLB. Further, the first switch SW1-2' for a second output channel OC2 may connect the second output channel OC2 to a second data line DL2 in a second column C2 in response to the first connection control signal CLA, and the second switch SW2-2' for the second output channel OC2 may connect the second output channel OC2 to a fourth data line DL4 located in a fourth column C4 spaced apart from the second column C2 by one column C3 in response to the second connection control signal CLB.

FIG. 9 illustrates timings 710 of the first output channel OC1, the first connection control signal CLA and the second connection control signal CLB in an odd-numbered frame period or a first frame period FP1, and timings 720 for the first output channel OC1, the first connection control signal CLA and the second connection control signal CLB in an even-numbered frame period or a second frame period FP2. As illustrated in FIG. 9, in the odd-numbered frame period or the first frame period FP1, the demultiplexer circuit 620 may sequentially connect the first output channel OC1 to first and third data lines DL1 and DL3 in the order of the first data line DL1 and the third data line DL3 in a first horizontal time HT1, may sequentially connect the first output channel OC1 to the first and third data lines DL1 and DL3 in the order of the third data line DL3 and the first data line DL1 in a second horizontal time HT2, may sequentially connect the first output channel OC1 to the first and third data lines DL1 and DL3 in the order of the first data line DL1 and the third data line DL3 in a third horizontal time HT3, and may sequentially connect the first output channel OC1 to the first and third data lines DL1 and DL3 in the order of the third data line DL3 and the first data line DL1 in a fourth horizontal time HT4. Further, in the first frame period FP1, the first output channel OC1 may sequentially output a first red data voltage RDV1 and a first blue data voltage BDV1 in the first horizontal time HT1, may sequentially output a second blue data voltage BDV2 and a red blue data voltage RDV2 in the second horizontal time HT2, may sequentially output a third red data voltage RDV3 and a third blue data voltage BDV3 in the third horizontal time HT3, and may sequentially output a fourth blue data voltage BDV4 and a fourth red data voltage RDV4 in the fourth horizontal time HT4.

However, unlike in the first frame period FP1, in the even-numbered frame period or the second frame period FP2, the demultiplexer circuit 620 may sequentially connect the first output channel OC1 to first and third data lines DL1 and DL3 in the order of the third data line DL3 and the first data line DL1 in the first horizontal time HT1, may sequentially connect the first output channel OC1 to the first and third data lines DL1 and DL3 in the order of the first data line DL1 and the third data line DL3 in the second horizontal time HT2, may sequentially connect the first output channel OC1 to the first and third data lines DL1 and DL3 in the order of the third data line DL3 and the first data line DL1 in the third horizontal time HT3, and may sequentially connect the first output channel OC1 to the first and third data lines DL1 and DL3 in the order of the first data line DL1 and the third data line DL3 in the fourth horizontal time HT4. Further, in the second frame period FP2, the first output channel OC1 may sequentially output the first blue data voltage BDV1 and the first red data voltage RDV1 in the first horizontal time HT1, may sequentially output the red blue data voltage RDV2 and the second blue data voltage BDV2 in the second horizontal time HT2, may sequentially output the third blue data voltage BDV3 and the third red data voltage RDV3 in the third horizontal time HT3, and may sequentially output the fourth red data voltage RDV4 and the fourth blue data voltage BDV4 in the fourth horizontal time HT4. Accordingly, since the rows affected by the coupling are switched between the odd-numbered frame period and the even-numbered frame period, the display panel 600 according to embodiments may display an image with uniform luminance.

Figure 10A:
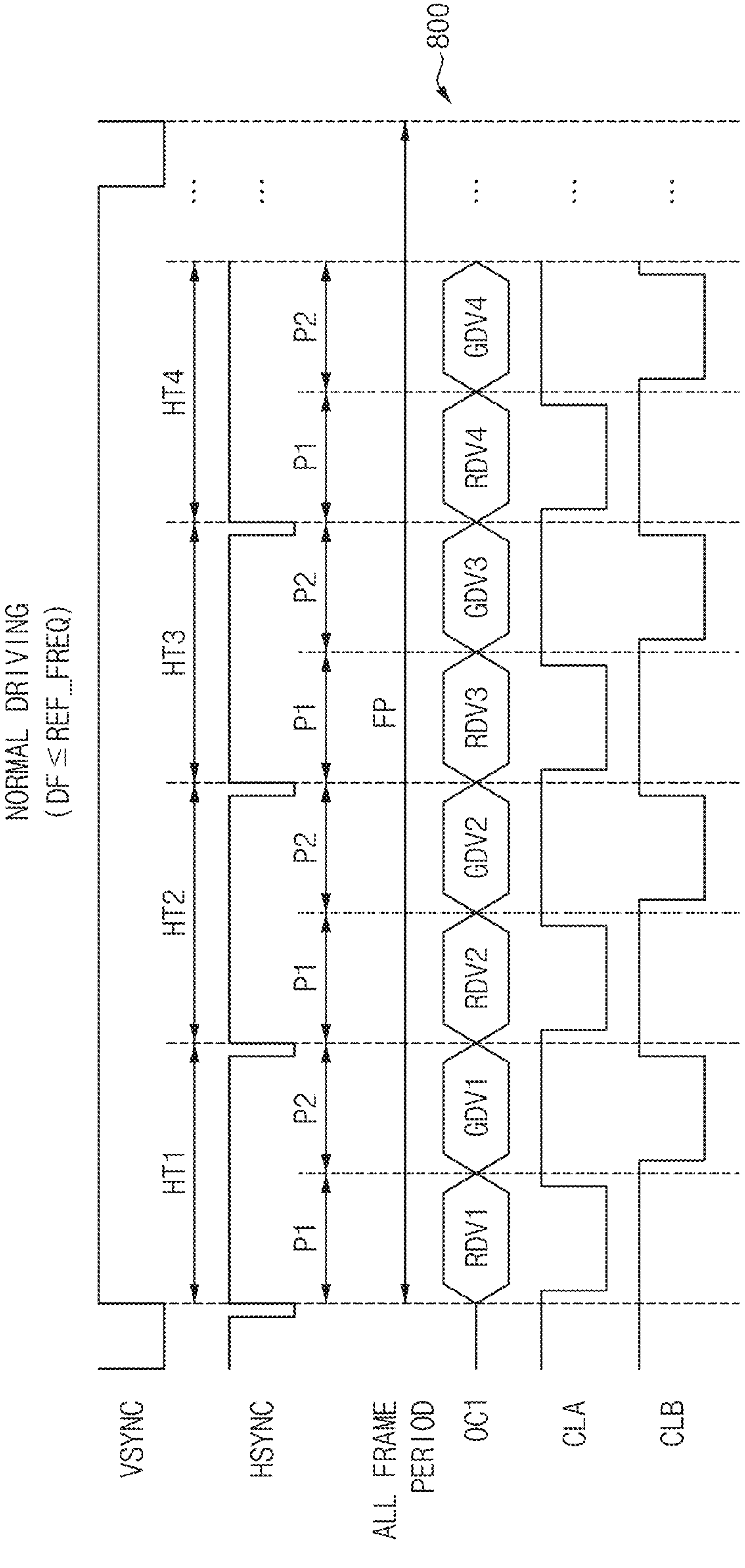
FIG. 10A is a timing diagram for describing an operation of a display panel in a normal driving mode according to embodiments.
Figure 10B:
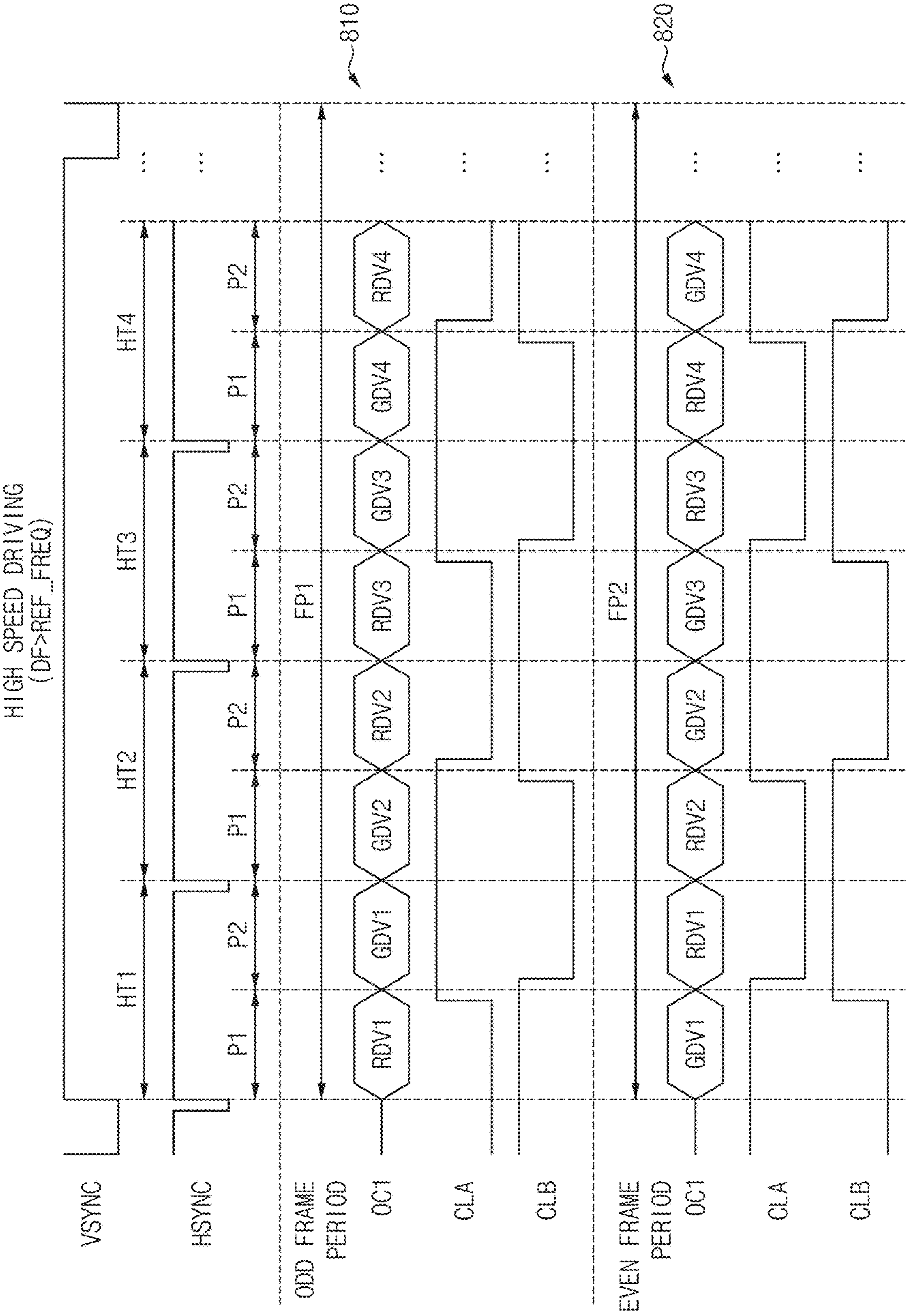
FIG. 10B is a timing diagram for describing an operation of a display panel in a high speed driving mode according to embodiments

FIG. 10A is a timing diagram for describing an operation of a display panel in a normal driving mode according to embodiments, and FIG. 10B is a timing diagram for describing an operation of a display panel in a high speed driving mode according to embodiments FIG. 10A illustrates timings 800 of a first output channel OC1, a first connection control signal CLA and a second connection control signal CLB in each frame period FP in a normal driving mode. FIG. 10B illustrates timings 810 of the first output channel OC1, the first connection control signal CLA and the second connection control signal CLB in an odd-numbered frame period or a first frame period FP1 in a high speed driving mode, and timing 820 of the first output channel OC1, the first connection control signal CLA and the second connection control signal CLB in an even-numbered frame period or a second frame period FP2 in the high speed driving mode.

Referring to FIGS. 1 and 10A, in a case where a display panel 100 is driven in the normal driving mode, or in a case where the display panel 100 is driven at a first driving frequency DF less than or equal to a reference frequency REF FREQ, a demultiplexer circuit 120 may perform a switching operation that switches data lines connected to each output channel twice in each horizontal time. For example, the reference frequency REF FREQ may be about 60 Hz, but is not limited thereto. The demultiplexer circuit 120 may perform the switching operation at a first period P1 (e.g., at a start time point of the first period P1) and at a second period P2 (e.g., at a start time point of the second period P2) of each horizontal time. For example, the demultiplexer circuit 120 may connect the first output channel OC1 to a first data line DL1 in response to the first connection control signal CLA in the first period P1 of each horizontal time, and may connect the first output channel OC1 to a second data line DL2 in response to the second connection control signal CLB in the second period P2 of each horizontal time.

Referring to FIGS. 1 and 10B, in a case where the display panel 100 is driven in the high speed driving mode, or in a case where the display panel 100 is driven at a second driving frequency DF greater than the reference frequency REF FREQ, the demultiplexer circuit 120 may perform the switching operation once in each horizontal time. In some embodiments, the demultiplexer circuit 120 may perform the switching operation between the first period P1 and the second period P2 of each horizontal time. Further, in some embodiments, the order of connecting each output channel (e.g., OC1) to data lines (e.g., DL1 and DL2) in each horizontal time of an odd-numbered frame period or a first frame period FP1 may be different from the order of connecting each output channel to the data lines in a corresponding horizontal time of an even-numbered frame period or a second frame period FP2.

For example, in the odd-numbered frame period or the first frame period FP1, the demultiplexer circuit 120 may perform the switching operation that switches a data line connected to the first output channel OC1 from the first data line DL1 to the second data line DL2 at a time point between the first period P1 and the second period P2 of each of first and third horizontal times HT2 and HT4, and may perform the switching operation that switches the data line connected to the first output channel OC1 from the second data line DL2 to the first data line DL1 at a time point between the first period P1 and the second period P2 of each of second and fourth horizontal times HT2 and HT4. In contrast, in the even-numbered frame period or the second frame period FP2, the demultiplexer circuit 120 may perform the switching operation that switches the data line connected to the first output channel OC1 from the second data line DL2 to the first data line DL1 at the time point between at the first period P1 and the second period P2 of each of the first and third horizontal times HT2 and HT4, and may perform the switching operation that switches the data line connected to the first output channel OC1 from the first data line DL1 to the second data line DL2 at the time point between the first period P1 and the second period P2 of each of the second and fourth horizontal times HT2 and HT4.

Accordingly, in the high speed driving mode, the power consumption for the switching operation of the demultiplexer circuit 120 may be reduced. Further, in the high speed driving mode, the rows affected by the coupling may be switched between the odd-numbered frame period and the even-numbered frame period, and thus the display panel 100 according to embodiments may display an image with uniform luminance.

Figure 11:
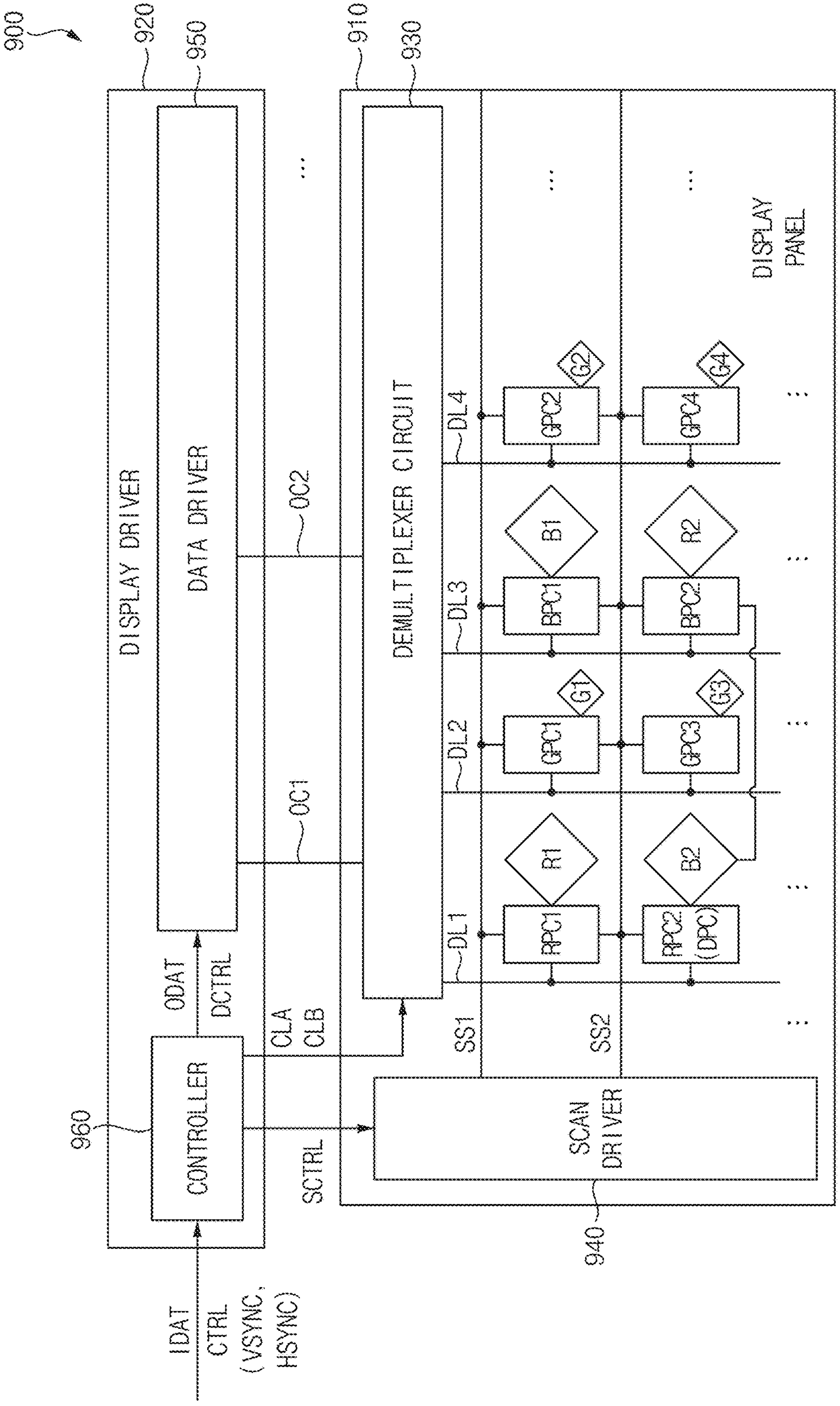
FIG. 11 is a block diagram illustrating a display device including a display panel and a display driver according to embodiments.

FIG. 11 is a block diagram illustrating a display device including a display panel and a display driver according to embodiments.

Referring to FIG. 11, a display device 900 according to embodiments may include a display panel 910, and a display driver 920 that drives the display panel 910. In some embodiments, a demultiplexer circuit 930 and a scan driver 940 may be formed or integrated on the display panel 910. In other embodiments, the demultiplexer circuit 930 and/or the scan driver 940 may be implemented as a separate integrated circuit, or may be included in the display driver 920. The display driver 920 may include a data driver 950 and a controller 960. In some embodiments, the display driver 920 may be implemented as a single integrated circuit, and this single integrated circuit may be referred to as a timing controller embedded data driver ("TED"). In other embodiments, the display driver 920 may be implemented with two or more integrated circuits in which the data driver 950 and the controller 960 are respectively implemented.

The display panel 910 may include a plurality of data lines DL1, DL2, DL3 and DL4, first light emitting elements R1, G1, B1 and G2 located in a first row, second light emitting elements B2, G3, R1 and G4 located in a second row adjacent to the first row, first pixel circuits RPC1, GPC1, BPC1 and GPC2 located in the first row and respectively connected to the plurality of data lines DL1, DL2, DL3 and DL4, and second pixel circuits RPC2, GPC3, BPC2 and GPC4 located in the second row and respectively connected to the plurality of data lines DL1, DL2, DL3 and DL4. Each of the first pixel circuits RPC1, GPC1, BPC1 and GPC2 may drive a light emitting element located in a column the same as a column in which the each of the first pixel circuits RPC1, GPC1, BPC1 and GPC2 is located among the first light emitting elements R1, G1, B1 and G2. At least one pixel circuit (e.g., BPC2) of the second pixel circuits RPC2, GPC3, BPC2 and GPC4 may drive a light emitting element located in a column (e.g., a first column) different from a column (e.g., a third column) in which the at least one pixel circuit (e.g., BPC2) is located among the second light emitting elements B2, G3, R1 and G4. Accordingly, in the display device 900 according to embodiments, although the light emitting elements R1, G1, B1, G2, B2, G3, R2 and G4 may be arranged in an RGBG pixel arrangement structure, pixel circuits (e.g., BPC1 and BPC2) for light emitting elements (e.g., B1 and B2) having the same color may be connected to each data line (e.g., DL3), and data voltages only for pixels having the same color may be provided to ach data line. Although FIG. 1 illustrates an example where the display panel 910 is a display panel 100 of FIG. 1, the display panel 910 of the display device 900 according to embodiments may be a display panel 300 of FIG. 5, a display panel 600 of FIG. 8, or a display panel having a similar structure.

The display driver 920 for driving the display panel 910 or the data driver 950 may have output channels OC1 and OC2 smaller in number than the number of the data lines DL1, DL2, DL3 and DL4 of the display panel 910, and the demultiplexer circuit 930 may selectively connect the output channels OC1 and OC2 of the data driver 950 to the plurality of data lines DL1, DL2, DL3 and DL4 in response to a first connection control signal CLA and a second connection control signal CLB from the controller 960. For example, as illustrated in FIG. 1 or FIG. 5, the demultiplexer circuit 930 may respectively connect first and second output channels OC1 and OC2 to first and third data lines DL1 and DL3 in response to the first connection control signal CLA, and may respectively connect the first and second output channels OC1 and OC2 to second and fourth data lines DL2 and DL4 in response to the second connection control signal CLB. In another example, as illustrated in FIG. 8, the demultiplexer circuit 930 may respectively connect the first and second output channels OC1 and OC2 to the first and second data lines DL1 and DL2 in response to the first connection control signal CLA, and may respectively connect the first and second output channels OC1 and OC2 to the third and fourth data lines DL3 and DL4 in response to the second connection control signal CLB.

The scan driver 940 may generate scan signals SS1 and SS2 based on a scan control signal SCTRL received from the controller 960, and sequentially provide the scan signals SS1 and SS2 to the pixel circuits RPC1, GPC1, BPC1, GPC2, RPC2, GPC3, BPC2 and GPC4 on a row-by-row basis. For example, the scan driver 940 may provide a first scan signal SS1 to the first pixel circuits RPC1, GPC1, BPC1 and GPC2 in a first horizontal time (or a second period of the first horizontal time) of each frame period, and may provide a second scan signal SS2 to the second pixel circuits RPC2, GPC3, BPC2 and GPC4 in a second horizontal time (or a second period of the second horizontal time) of each frame period. In some embodiments, the scan control signal SCTRL may include, but not limited to, a scan start signal and a scan clock signal.

The data driver 950 may generate data voltages based on a data control signal DCTRL and output image data ODAT received from the controller 960, and the output channels OC1 and OC2 of the data driver 950 may provide the data voltages to the pixel circuits RPC1, GPC1, BPC1, GPC2, RPC2, GPC3, BPC2, and GPC4 through the plurality of data lines DL1, DL2, DL3 and DL4. In some embodiments, the data control signal DCTRL may include, but not limited to, an output data enable signal, a horizontal start signal and a load signal.

The controller 960 (e.g., a timing controller ("T-CON")) may receive input image data IDAT and a control signal CTRL from an external host processor (e.g., an application processor ("AP"), a graphics processing unit ("GPU") or a graphics card). In some embodiments, the control signal CTRL may include, but not limited to, a vertical synchronization signal VSYNC, a horizontal synchronization signal HSYNC, an input data enable signal and a master clock signal. The controller 960 may generate the output image data ODAT, the data control signal DCTRL, the scan control signal SCTRL and the connection control signals CLA and CLB based on the input image data IDAT and the control signal CTRL. The controller 960 may control the data driver 950 by providing the output image data ODAT and the data control signal DCTRL to the data driver 950, may control the scan driver 940 by providing the scan control signal SCTRL to the scan driver 940, and may control the demultiplexer circuit 930 by providing the connection control signals CLA and CLB to the demultiplexer circuit 930.

In the display device 900 according to embodiments, each frame period may include a plurality of horizontal times, and each horizontal time may include a first period and a second period. In the first period of the first horizontal time of a first frame period, the demultiplexer circuit 930 may connect the first output channel OC1 to the first data line DL1, and the first output channel OC1 may output a data voltage for a first color pixel (e.g., a red pixel) to the first data line DLL Further, in the second period of the first horizontal time of the first frame period, the demultiplexer circuit 930 may connect the first output channel OC1 to the second data line DL2, and the first output channel OC1 may output a data voltage for a second color pixel (e.g., a green pixel) to the second data line DL2. In contrast, in the first period of the first horizontal time of a second frame period, the demultiplexer circuit 930 may connect the first output channel OC1 to the second data line DL2, and the first output channel OC1 may output a data voltage for the second color pixel (e.g., the green pixel). Further, in the second period of the first horizontal time of the second frame period, the demultiplexer circuit 930 may connect the first output channel OC1 to the first data line DL1, and the first output channel OC1 may output a data voltage for the first color pixel (e.g., the red pixel) to the first data line DL1. Accordingly, since the rows affected by the coupling are switched between the first frame period and the second frame period, the display panel 910 of the display device 900 according to embodiments may display an image with uniform luminance.

Figure 12:
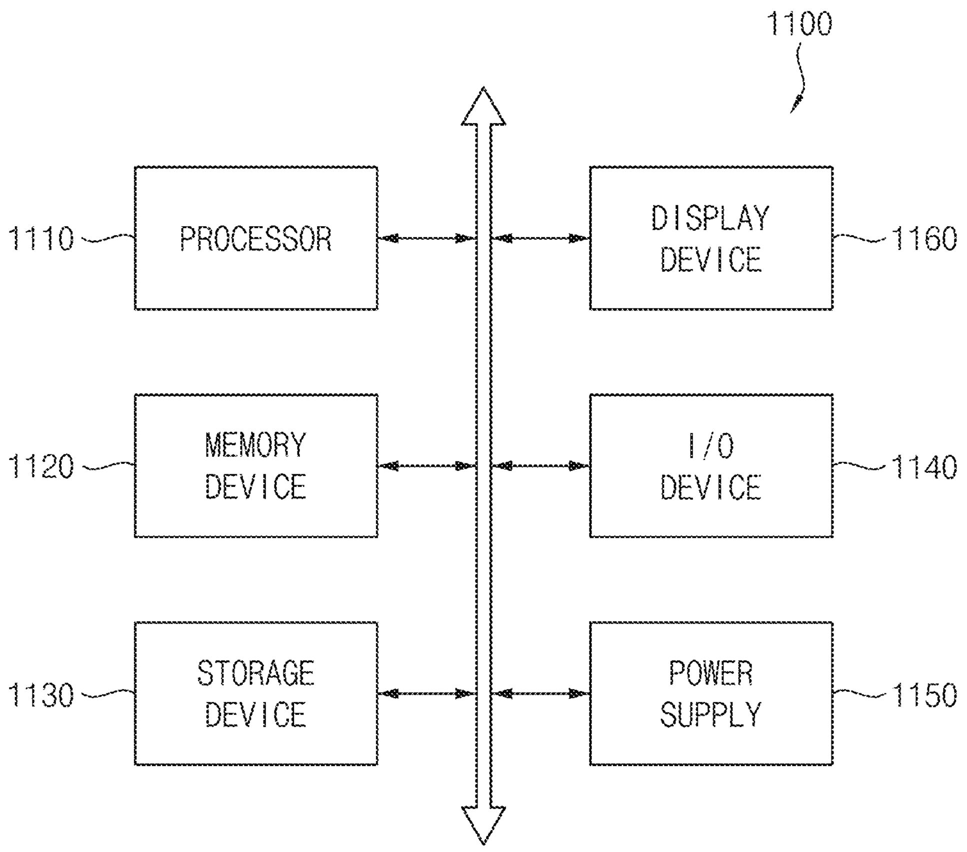
FIG. 12 is a block diagram illustrating an electronic device including a display device according to embodiments.

FIG. 12 is a block diagram illustrating an electronic device including a display device according to embodiments.

Referring to FIG. 12, an electronic device 1100 may include a processor 1110, a memory device 1120, a storage device 1130, an input/output ("I/O") device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor (AP), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile dynamic random access memory (mobile DRAM) device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc. and an output device such as a printer, a speaker, etc. The power supply 1150 may supply power for operations of the electronic device 1100. The display device 1160 may be coupled to other components through the buses or other communication links.

In the display device 1160, at least one pixel circuit may drive a light emitting element located in a column different from a column in which the at least one pixel circuit is located. Accordingly, pixel having the same color may be connected to each data line, and thus power consumption for charging and discharging the data line may be effectively reduced. Further, in the display device 1160, an output order of data voltages in at least one horizontal time of a first frame period may be different from an output order of data voltages in a corresponding horizontal time of a second frame period. Accordingly, a display panel may display an image with uniform luminance.

The inventions may be applied to any display device 1160, and any electronic device 1100 including the display device 1160. For example, the inventions may be applied to a mobile phone, a smart phone, a tablet computer, a television ("TV"), a digital TV, a 3D TV, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display panel of a display device, the display panel comprising:
- first light emitting elements located in a first row;
- second light emitting elements located in a second row adjacent to the first row;
- first pixel circuits located in the first row; and
- second pixel circuits located in the second row,
- wherein the second light emitting elements include:
  - a second blue light emitting element located in a first column;
  - a third green light emitting element located in a second column;
  - a second red light emitting element located in a third column; and
  - a fourth green light emitting element located in a fourth column,
- wherein the second pixel circuits include:
  - a third green pixel circuit located in the second column, and configured to drive the third green light emitting element;
  - a second blue pixel circuit located in the third column, and configured to drive the second blue pixel light emitting element located in the first column; and
  - a fourth green pixel circuit located in the fourth column, and configured to drive the fourth green light emitting element.

2. The display panel of claim 1, wherein the first light emitting elements include:
- a first red light emitting element located in the first column;
- a first green light emitting element located in the second column;
- a first blue light emitting element located in the third column; and
- a second green light emitting element located in the fourth column.

3. The display panel of claim 2, wherein the first pixel circuits include:
- a first red pixel circuit located in the first column, and configured to drive the first red light emitting element;
- a first green pixel circuit located in the second column, and configured to drive the first green light emitting element;
- a first blue pixel circuit located in the third column, and configured to drive the first blue light emitting element; and
- a second green pixel circuit located in the fourth column, and configured to drive the second green light emitting element.

4. The display panel of claim 3, wherein an anode of the second blue light emitting element located in the first column is extended such that the anode of the second blue light emitting element is connected to the second blue pixel circuit located in the third column.

5. The display panel of claim 3, wherein the second pixel circuits further include:
- a dummy pixel circuit located in the first column, and configured to drive no light emitting element.

6. The display panel of claim 3, wherein the second pixel circuits further include a pixel circuit located in a fifth column, and the second red light emitting element located in the third column is driven by the pixel circuit located in the fifth column among the second pixel circuits.

7. The display panel of claim 1, further comprising:

a first data line;

a second data line; and a demultiplexer circuit configured to selectively connect an output channel of a display driver to the first data line or the second data line.

8. The display panel of claim 7, wherein the demultiplexer circuit includes:

a first switch configured to connect the output channel to the first data line in response to a first connection control signal; and a second switch configured to connect the output channel to the second data line in response to a second connection control signal.

9. The display panel of claim 7, wherein the demultiplexer circuit performs a switching operation once in each horizontal time.

10. The display panel of claim 7, wherein a frame period includes a first horizontal time, and a second horizontal time subsequent to the first horizontal time, wherein each of the first and second horizontal times includes a first period, and a second period subsequent to the first period, and wherein the demultiplexer circuit connects the output channel to the first data line in the first period of the first horizontal time, connects the output channel to the second data line in the second period of the first horizontal time and the first period of the second horizontal time, and connects the output channel to the first data line in the second period of the second horizontal time.

11. The display panel of claim 7, wherein an order of connecting the output channel to the first and second data lines in a horizontal time of a first frame period is different from an order of connecting the output channel to the first and second data lines in a corresponding horizontal time of a second frame period.

12. The display panel of claim 7, wherein each of a first frame period, and a second frame period subsequent to the first frame period includes a first horizontal time, and a second horizontal time subsequent to the first horizontal time, wherein each of the first and second horizontal times includes a first period, and a second period subsequent to the first period, wherein a data voltage for a first color pixel is applied to the first data line in the first period of the first horizontal time of the first frame period, wherein a data voltage for a second color pixel is applied to the second data line in the second period of the first horizontal time of the first frame period, wherein a data voltage for another second color pixel is applied to the second data line in the first period of the second horizontal time of the first frame period, wherein a data voltage for another first color pixel is applied to the first data line in the second period of the second horizontal time of the first frame period, wherein the data voltage for the second color pixel is applied to the second data line in the first period of the first horizontal time of the second frame period, wherein the data voltage for the first color pixel is applied to the first data line in the second period of the first horizontal time of the second frame period, wherein the data voltage for the another first color pixel is applied to the first data line in the first period of the second horizontal time of the second frame period, and wherein the data voltage for the another second color pixel is applied to the second data line in the second period of the second horizontal time of the second frame period.

13. The display panel of claim 7, wherein each of two or more consecutive first frame period, and two or more consecutive second frame periods subsequent to the first frame periods includes a first horizontal time, and a second horizontal time subsequent to the first horizontal time, wherein each of the first and second horizontal times includes a first period, and a second period subsequent to the first period, wherein a data voltage for a first color pixel is applied to the first data line in the first period of the first horizontal time of each of the first frame periods, wherein a data voltage for a second color pixel is applied to the second data line in the second period of the first horizontal time of each of the first frame periods, wherein a data voltage for another second color pixel is applied to the second data line in the first period of the second horizontal time of each of the first frame periods, wherein a data voltage for another first color pixel is applied to the first data line in the second period of the second horizontal time of each of the first frame periods, wherein the data voltage for the second color pixel is applied to the second data line in the first period of the first horizontal time of each of the second frame periods, wherein the data voltage for the first color pixel is applied to the first data line in the second period of the first horizontal time of each of the second frame periods, wherein the data voltage for the another first color pixel is applied to the first data line in the first period of the second horizontal time of each of the second frame periods, and wherein the data voltage for the another second color pixel is applied to the second data line in the second period of the second horizontal time of each of the second frame periods.

14. The display panel of claim 7, wherein the first data line is located in a first column, and wherein the second data line is located in a second column directly adjacent to the first column.

15. The display panel of claim 7, wherein the first data line is located in a first column, and wherein the second data line is located in a third column spaced apart from the first column.

16. The display panel of claim 7, wherein the demultiplexer circuit performs a switching operation twice in each horizontal time when the display panel is driven at a first driving frequency less than or equal to a reference frequency, and performs the switching operation once in each horizontal time when the display panel is driven at a second driving frequency greater than the reference frequency.

17. A display driver that drives a display panel including a first data line and a second data line, the display driver comprising:

an output channel selectively connected to the first data line or the second data line, wherein each of a first frame period, and a second frame period subsequent to the first frame period includes a first horizontal time, and a second horizontal time subsequent to the first horizontal time, wherein starting time and ending time of each of the first frame period and the second frame period is defined by a vertical synchronization signal, and starting time and ending time of each of the first horizontal time and the second horizontal time is defined by a horizontal synchronization signal, wherein each of the first and second horizontal times includes a first period, and a second period subsequent to the first period, and wherein the output channel outputs a data voltage for a first color pixel to the first data line in the first period of the first horizontal time of the first frame period, outputs a data voltage for a second color pixel to the second data line in the second period of the first horizontal time of the first frame period, outputs a data voltage for the second color pixel to the second data line in the first period of the first horizontal time of the second frame period, and outputs a data voltage for the first color pixel to the first data line in the second period of the first horizontal time of the second frame period.

18. The display panel of claim 17, wherein the output channel outputs a data voltage for another second color pixel to the second data line in the first period of the second horizontal time of the first frame period, outputs a data voltage for another first color pixel to the first data line in the second period of the second horizontal time of the first frame period, outputs a data voltage for the another first color pixel to the first data line in the first period of the second horizontal time of the second frame period, and outputs a data voltage for the another second color pixel to the second data line in the second period of the second horizontal time of the second frame period.

19. A display device comprising:

a display panel including a plurality of data lines including a first data line and a second data line;

a display driver configured to drive the display panel, and including a plurality of output channels including a first output channel; and a demultiplexer circuit configured to selectively connect the first output channel to the first data line or the second data line, wherein the display panel further includes:

first light emitting elements located in a first row;

second light emitting elements located in a second row adjacent to the first row;

first pixel circuits located in the first row, and connected to the plurality of data lines, respectively; and second pixel circuits located in the second row, and connected to the plurality of data lines, respectively, wherein each of the first pixel circuits drives a first light emitting element, located in a column the same as a column in which the each of the first pixel circuits is located, among the first light emitting elements, wherein at least one second pixel circuit of the second pixel circuits drives a second light emitting element, located in a column different from a column in which the at least one second pixel circuit is located, among the second light emitting elements, wherein each of a first frame period, and a second frame period subsequent to the first frame period includes a first horizontal time, and a second horizontal time subsequent to the first horizontal time, wherein starting time and ending time of each of the first frame period and the second frame period is defined by a vertical synchronization signal, and starting time and ending time of each of the first horizontal time and the second horizontal time is defined by a horizontal synchronization signal, wherein each of the first and second horizontal times includes a first period, and a second period subsequent to the first period, wherein, in the first period of the first horizontal time of the first frame period, the demultiplexer circuit connects the first output channel to the first data line, and the first output channel outputs a data voltage for a first color pixel to the first data line, wherein, in the second period of the first horizontal time of the first frame period, the demultiplexer circuit connects the first output channel to the second data line, and the first output channel outputs a data voltage for a second color pixel to the second data line, wherein, in the first period of the first horizontal time of the second frame period, the demultiplexer circuit connects the first output channel to the second data line, and the first output channel outputs a data voltage for the second color pixel to the second data line, and wherein, in the second period of the first horizontal time of the second frame period, the demultiplexer circuit connects the first output channel to the first data line, and the first output channel outputs a data voltage for the first color pixel to the first data line.

* * * * *